(12) United States Patent
Ikeda

(10) Patent No.: US 10,396,551 B2
(45) Date of Patent: Aug. 27, 2019

(54) ELECTROSTATIC PROTECTION CIRCUIT, SEMICONDUCTOR INTEGRATED CIRCUIT DEVICE, AND ELECTRONIC DEVICE

(71) Applicant: SEIKO EPSON CORPORATION, Tokyo (JP)

(72) Inventor: Masuhide Ikeda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 272 days.

(21) Appl. No.: 15/420,636

(22) Filed: Jan. 31, 2017

(65) Prior Publication Data

US 2017/0244243 A1  Aug. 24, 2017

(30) Foreign Application Priority Data

Feb. 23, 2016 (JP) .................................. 2016-031696

(51) Int. Cl.
*H02H 9/04* (2006.01)

(52) U.S. Cl.
CPC .................................. *H02H 9/046* (2013.01)

(58) Field of Classification Search
CPC ....................................................... H02H 9/04
See application file for complete search history.

(56) References Cited

U.S. PATENT DOCUMENTS

| | | | | |
|---|---|---|---|---|
| 6,501,632 B1 * | 12/2002 | Avery | ............... | H01L 27/0277 327/313 |
| 8,120,887 B2 * | 2/2012 | Mallikararjunaswamy ................. H01L 27/0262 361/111 |
| 2002/0020881 A1 | 2/2002 | Okawa | | |
| 2002/0030231 A1 | 3/2002 | Okawa et al. | | |
| 2005/0057866 A1 * | 3/2005 | Mergens | ............ | H01L 27/0262 361/56 |
| 2011/0304944 A1 * | 12/2011 | Salcedo | .................. | H01L 23/60 361/111 |
| 2014/0167099 A1 * | 6/2014 | Mergens | ............ | H01L 27/0262 257/109 |
| 2014/0192445 A1 | 7/2014 | Ikeda | | |
| 2015/0162745 A1 | 6/2015 | Ikeda | | |

(Continued)

FOREIGN PATENT DOCUMENTS

| | | |
|---|---|---|
| JP | 2001-345421 A | 12/2001 |
| JP | 2001-351986 A | 12/2001 |

(Continued)

*Primary Examiner* — Scott Bauer

(74) *Attorney, Agent, or Firm* — Oliff PLC

(57) ABSTRACT

This electrostatic protection circuit enables a trigger voltage to be set arbitrarily and enables a high hold voltage to be set, without providing an RC timer having a large circuit area. This electrostatic protection circuit is connected to a first terminal via a first node and is connected to a second terminal via a second node. The electrostatic protection circuit is provided with a plurality of circuit blocks that are connected in series between the first node and the second node, and at least one circuit block out of the plurality of circuit blocks includes a zener diode for setting a trigger voltage. The electrostatic protection circuit enters a conduction state when the potential of the first node becomes higher than the potential of the second node and the voltage between both ends of the circuit block including the zener diode reaches the breakdown voltage of the zener diode.

9 Claims, 16 Drawing Sheets

(56) References Cited

U.S. PATENT DOCUMENTS

2015/0162746 A1 6/2015 Ikeda
2016/0149403 A1 5/2016 Ikeda

FOREIGN PATENT DOCUMENTS

| | | |
|---|---|---|
| JP | 2014-120547 A | 6/2014 |
| JP | 2014-132717 A | 7/2014 |
| JP | 2015-115338 A | 6/2015 |
| JP | 2015-115339 A | 6/2015 |
| JP | 2016-100525 A | 5/2016 |

\* cited by examiner

ELECTROSTATIC PROTECTION CIRCUIT, SEMICONDUCTOR INTEGRATED CIRCUIT DEVICE, AND ELECTRONIC DEVICE

BACKGROUND

1. Technical Field

The present invention relates to an electrostatic protection circuit that protects an internal circuit of a semiconductor integrated circuit device from ESD (electrostatic discharge). Furthermore, the invention relates to a semiconductor integrated circuit device that incorporates such an electrostatic protection circuit, and to an electronic device or the like that uses such a semiconductor integrated circuit device.

2. Related Art

Provision of an electrostatic protection circuit in a semiconductor integrated circuit device is carried out in order to prevent breakdown of an internal circuit due to static electricity charged on a person's body, a conveyance device or the like being applied to the internal circuit. For example, the electrostatic protection circuit is connected between a first terminal to which a power supply potential on a high potential side is supplied and a second terminal to which a power supply potential on a low potential side is supplied.

A positive charge is released to the second terminal via the electrostatic protection circuit when a positive charge is applied to the first terminal by electrostatic discharge or the like, thus enabling breakdown of the internal circuit to be prevented since an excessive voltage is not applied to the internal circuit. On the other hand, in order to avoid malfunction during normal operation, a trigger voltage and a hold voltage of the electrostatic protection circuit are desirably set higher than a power supply voltage.

As a related technology, an ESD protection circuit that is provided with a first clamp circuit and a second clamp circuit serially connected between a first power supply terminal and a second power supply terminal is disclosed in FIGS. 1 and 2 of JP-A-2014-120547. The first clamp circuit has a first protection transistor in which the drain is connected to a first high potential side node and the source and the gate are connected to a first low potential side node.

The second clamp circuit has a resistance element connected at one end to a second high potential side node, a capacitance element provided between a second low potential side node and the other end of the resistance element, an inverter that outputs a control signal of a logical value that depends on a potential of the connection point of the resistance element and the capacitance element, and a second protection transistor in which the drain is connected to the second high potential side node, the source is connected to the second low potential side node, and the control signal is supplied to the gate and the back gate.

Here, the resistance element, the capacitance element and the like that decide the response time of the second clamp circuit are also referred to as an RC timer. Although a high hold voltage can also be set by serially connecting the two clamp circuits having an RC timer, there is a risk of the trigger voltage falling below the power supply voltage due to the action of the RC timer, causing discharge current to flow during normal operation. According to the ESD protection circuit shown in FIGS. 1 and 2 of JP-A-2014-120547, the two clamp circuits are serially connected between the first power supply terminal and the second power supply terminal, making it possible to set a high hold voltage and to suppress an increase in discharge current during normal operation.

In the case where, however, the source-drain voltage of the first protection transistor shows a different value to the source-drain voltage of the second protection transistor immediately after power on, there is a risk of not being able to accurately prevent breakdown of a protected circuit. Furthermore, a higher voltage than the voltage that is applied between the source and the drain of the first protection transistor is applied between the source and the drain of the second protection transistor, thus causing breakdown or deterioration of the second protection transistor to readily occur, due to prolonged normal operation.

In view of this, respectively connecting the first resistance element and the second resistance element that have the same resistance value in parallel to the first clamp circuit and the second clamp circuit has also been proposed, as shown in FIG. 9 of JP-A-2014-120547. The current that flows to the first resistance element is sufficiently larger than the leakage current that flows to the first clamp circuit, and the current that flows to the second resistance element is sufficiently larger than the leakage current that flows to the second clamp circuit. The source-drain voltage of the first protection transistor and the source-drain voltage of the second protection transistor are thereby equalized, enabling breakdown of a protected circuit to be accurately prevented, and breakdown or deterioration of the second protection transistor to be prevented.

JP-A-2014-120547 is an example of related art (see paras. 0005 to 0006, 0082 to 0086, FIGS. 1, 2 and 9).

SUMMARY

According to the ESD protection circuit shown in FIGS. 1 and 2 of JP-A-2014-120547, a high hold voltage can be set and an increase in discharge current during normal operation can be suppressed, but the RC timer of the second clamp circuit results in an increase in circuit area (chip size). Also, in the case of respectively connecting the first resistance element and the second resistance element in parallel to the first clamp circuit and the second clamp circuit, as shown in FIG. 9 of JP-A-2014-120547, the circuit area is further increased.

In view of this, an advantage of some aspects of the invention is to provide an electrostatic protection circuit that enables a high hold voltage to be set and enables the trigger voltage to be arbitrarily set, without providing an RC timer having a large circuit area. Another advantage of some aspects of the invention is to accurately prevent breakdown of a protected circuit immediately after power on and to prevent breakdown or deterioration of a protection device during prolonged normal operation, without connecting a resistance element in parallel to a plurality of circuit blocks connected in series in such an electrostatic protection circuit. A further advantage of some aspects of the invention is to provide a semiconductor integrated circuit device that incorporates such an electrostatic protection circuit, and an electronic device or the like that uses such a semiconductor integrated circuit device.

An electrostatic protection circuit according to a first aspect of the invention is connected to a first terminal via a first node and connected to a second terminal via a second node, and includes a plurality of circuit blocks that are connected in series between the first node and the second node. At least one circuit block out of the plurality of circuit blocks includes a zener diode for setting a trigger voltage, and enters a conduction state when a potential of the first node becomes higher than a potential of the second node and a voltage between both ends of the circuit block including the zener diode reaches a breakdown voltage of the zener diode.

According to the first aspect of the invention, a plurality of circuit blocks are connected in series, thus enabling a high hold voltage to be set. Also, because at least one circuit block includes a zener diode for setting the trigger voltage, the trigger voltage of the electrostatic protection circuit can be arbitrarily set, by adjusting the breakdown voltage of the zener diode through ion doping. Accordingly, an electrostatic protection circuit can be provided that enables a high hold voltage to be set and enables the trigger voltage to be set arbitrarily, without providing an RC timer having a large circuit area.

In particular, in the case where the leakage current of the plurality of circuit blocks is comparatively high, the ratio of the voltages that are applied to the plurality of circuit blocks during normal operation is decided by the leakage current that flows through the circuit blocks. It is thereby possible to accurately prevent breakdown of the protected circuit immediately after power on, and to prevent breakdown or deterioration of the protection device during prolonged normal operation, without connecting a resistance element in parallel to the plurality of circuit blocks connected in series in the electrostatic protection circuit. As a result, a resistance element for voltage division and an RC timer are no longer required, in comparison with the related technology shown in FIG. 9 of JP-A-2014-120547, thus enabling circuit area (chip size) to be reduced.

Here, a configuration may be adopted in which the circuit block including the zener diode further includes a bipolar transistor that has a collector connected to one end of the circuit block including the zener diode and an emitter connected to another end of the circuit block including the zener diode, and a resistance element that is connected between the emitter and a base of the bipolar transistor. The zener diode is connected between the collector and the base of the bipolar transistor and allows current to flow to the resistance element or to the base of the bipolar transistor when the potential of the first node becomes higher than the potential of the second node and the voltage between both ends of the circuit block including the zener diode reaches the breakdown voltage.

It is thus also possible to form a circuit block in which the trigger voltage is set lower than the hold voltage, by adopting a configuration that controls the base current of a bipolar transistor using a zener diode and a resistance element.

Alternatively, a configuration may be adopted in which the circuit block including the zener diode further includes a thyristor that has an anode connected to one end of the circuit block including the zener diode and a cathode connected to another end of the circuit block including the zener diode, and a resistance element that is connected between a gate of the thyristor and one of the cathode and the anode of the thyristor. The zener diode is connected between the gate of the thyristor and the other of the cathode and the anode of the thyristor, and allows current to flow to the resistance element or to the gate of the thyristor when the potential of the first node becomes higher than the potential of the second node and the voltage between both ends of the circuit block including the zener diode reaches the breakdown voltage.

Because the hold voltage of a thyristor is not very large, it is also possible to form a circuit block in which the trigger voltage is set to a voltage approximating the hold voltage, by adjusting the breakdown voltage of a zener diode through ion doping.

In the above, a configuration may be adopted in which another at least one circuit block out of the plurality of circuit blocks includes a MOS transistor that has a drain connected to one end of the other at least one circuit block and a source and a gate connected to another end of the other at least one circuit block, and that allows discharge current to flow when the potential of the first node becomes higher than the potential of the second node and the voltage between both ends of the other at least one circuit block reaches a breakdown voltage.

In the case of using a MOS transistor having a low breakdown voltage, the trigger voltage and the hold voltage of the other at least one circuit block are characterized in being relatively low. Accordingly, by using a MOS transistor having a low breakdown voltage, the trigger voltage and the hold voltage of the electrostatic protection circuit can be finely set according to the specification of the power supply voltage.

Alternatively, a configuration may be adopted in which another at least one circuit block out of the plurality of circuit blocks includes a bipolar transistor that has a collector connected to one end of the other at least one circuit block and an emitter connected to another end of the other at least one circuit block, and that allows discharge current to flow when the potential of the first node becomes higher than the potential of the second node and the voltage between both ends of the other at least one circuit block reaches a breakdown voltage.

In the case of using a bipolar transistor having a low breakdown voltage, the trigger voltage and the hold voltage of the other at least one circuit block are characterized in being relatively low. Accordingly, by using a bipolar transistor having a low breakdown voltage, the trigger voltage and the hold voltage of the electrostatic protection circuit can be finely set according to the specification of the power supply voltage.

In that case, a configuration may be adopted in which a predetermined region, of the drain or the source of the MOS transistor or of the collector of the bipolar transistor, including a portion that a contact contacts is silicided, and a remaining region of the drain or the source or of the collector is not silicided. The breakdown current of the electrostatic protection circuit can thereby be increased, improving the electrostatic breakdown strength.

Alternatively, a configuration may be adopted in which another at least one circuit block out of the plurality of circuit blocks includes a thyristor that has an anode connected to one end of the other at least one circuit block and a cathode connected to another end of the other at least one circuit block, a resistance element that is connected between a gate of the thyristor and one of the cathode and the anode of the thyristor, and a zener diode that is connected between the gate of the thyristor and the other of the cathode and the anode of the thyristor and that allows current to flow to the resistance element or to the gate of the thyristor when the potential of the first node becomes higher than the potential of the second node and the voltage between both ends of the circuit block reaches a second breakdown voltage.

In that case, it is also possible to form a circuit block in which the trigger voltage is set to a voltage approximating the hold voltage, by adjusting the breakdown voltage of a plurality of zener diodes through ion doping. Also, the ratio of the voltages that are applied to the plurality of circuit blocks during normal operation can be set, utilizing the leakage current that flows through the plurality of zener diodes.

A semiconductor integrated circuit device according to a second aspect of the invention is provided with any of the above electrostatic protection circuits. According to the second aspect of the invention, a semiconductor integrated circuit device that has a high breakdown voltage and does not readily malfunction and with which an increase in chip size is suppressed can be provided by incorporating an electrostatic protection circuit that enables a high hold voltage to be set and the trigger voltage to be set arbitrarily, without providing an RC timer having a large circuit area.

An electronic device according to a third aspect of the invention is provided with the above semiconductor integrated circuit device. According to the third aspect of the invention, a highly reliable electronic device can be provided at low cost, using a semiconductor integrated circuit device that has a high breakdown voltage and does not readily malfunction and with which an increase in chip size is suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
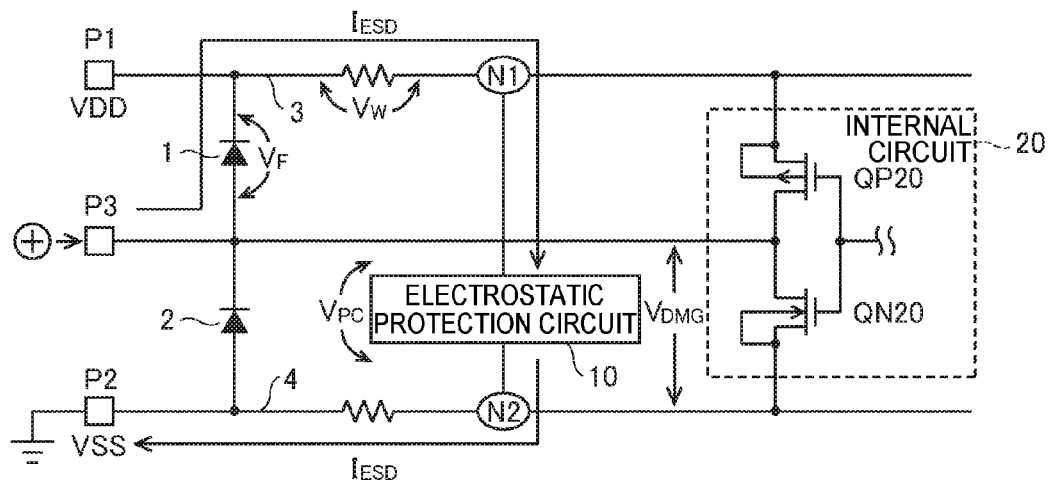
FIG. 1 is a circuit diagram showing an exemplary configuration of a semiconductor integrated circuit device according to one embodiment of the invention.

Hereinafter, embodiments of the invention will be described in detail, with reference to the drawings. Note that like reference numerals are given to like constituent elements, and redundant description will be omitted.

Figure 2:
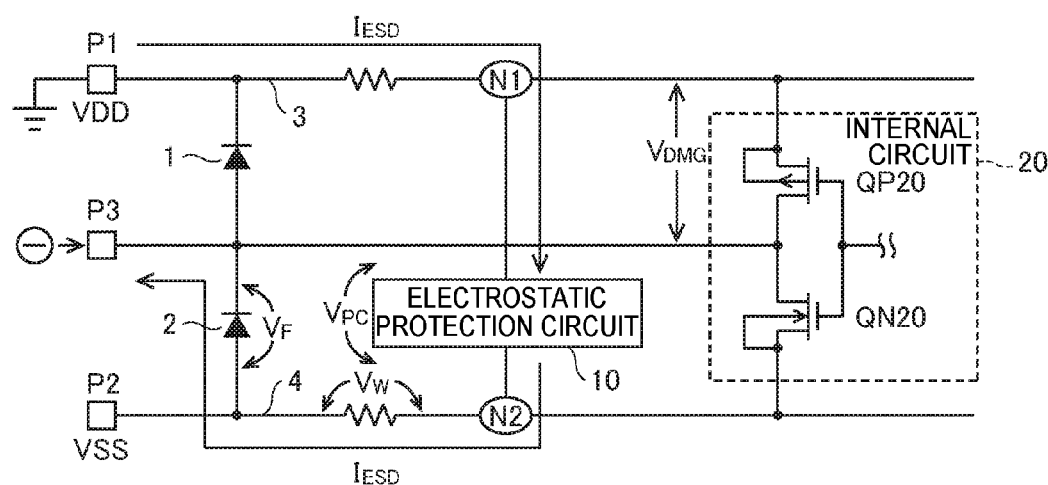
FIG. 2 is a circuit diagram showing an exemplary configuration of a semiconductor integrated circuit device according to one embodiment of the invention.

FIGS. 1 and 2 are circuit diagrams showing an exemplary configuration of a semiconductor integrated circuit device according to one embodiment of the invention. This semiconductor integrated circuit device includes power supply terminals P1 and P2, a signal terminal P3, diodes 1 and 2, power supply interconnects 3 and 4, an electrostatic protection circuit 10 according to any of the embodiments of the invention, and an internal circuit 20. The power supply interconnects 3 and 4 each have a resistance component. Also, the internal circuit 20 includes a P-channel MOS transistor QP20 and an N-channel MOS transistor QN20.

In FIGS. 1 and 2, the signal terminal P3 is connected to an output side of the internal circuit 20 (drains of the transistors QP20 and QN20), but the signal terminal P3 may be connected to an input side of the internal circuit 20 (gates of the transistors QP20 and QN20). In any case, the operating specifications of the electrostatic protection circuit 10 are mainly decided by the gate breakdown voltage of the transistors of the internal circuit 20.

For example, the electrostatic protection circuit 10 may be connected between the power supply terminal P1 to which a power supply potential VDD on the high potential side is supplied and the power supply terminal P2 to which a power supply potential VSS on the low potential side is supplied. Also, the electrostatic protection circuit 10 may be connected between the power supply terminal P1 and the signal terminal P3, or may be connected between the signal terminal P3 and the power supply terminal P2. In the following embodiments, the case where the electrostatic protection circuit 10 is connected to the power supply terminal P1 via a node N1 and is connected to the power supply terminal P2 via a node N2, as shown in FIGS. 1 and 2, will be described as an example.

When a positive charge is applied to the power supply terminal P2 by electrostatic discharge or the like, a positive charge is released to the signal terminal P3 via the diode 2 or is released to the power supply terminal P1 via the diodes 2 and 1, thus enabling breakdown of the internal circuit 20 to be prevented, since an excessive voltage is not applied to the internal circuit 20. Accordingly, a problem arises in the case where a reverse voltage is applied to at least one of the diodes 1 and 2.

The discharge path in the case where a positive charge is applied to the signal terminal P3 by electrostatic discharge or the like while the power supply terminal P2 is grounded is shown in FIG. 1. Due to the electrostatic discharge or the like, a surge current $I_{ESD}$ flows on a path through the diode 1, the power supply interconnect 3, the electrostatic protection circuit 10 and the power supply interconnect 4.

In the discharge operation, the electrostatic protection circuit 10 is able to protect the internal circuit 20, if the drain-source voltage of the transistor QN20 connected in parallel to the diode 2 to which the reverse voltage is applied is smaller than a breakdown voltage $V_{DMG}$ that leads to breakdown of the transistor QN20. To achieve this, the following equation (1) needs to be satisfied.

$$V_F + V_W + V_{PC} < V_{DMG} \quad (1)$$

Here, $V_F$ is the forward voltage of the diode 1, $V_W$ is the voltage that is produced when the surge current $I_{ESD}$ flows to the resistance component of the power supply interconnect 3, and $V_{PC}$ is the voltage that is produced when the surge current $I_{ESD}$ flows to the electrostatic protection circuit 10.

Also, the discharge path in the case where a negative charge is applied to the signal terminal P3 by electrostatic discharge or the like while the power supply terminal P1 is grounded is shown in FIG. 2. Due to the electrostatic discharge or the like, the surge current $I_{ESD}$ flows in a path through the power supply interconnect 3, the electrostatic protection circuit 10, the power supply interconnect 4 and the diode 2.

In the discharge operation, the electrostatic protection circuit 10 is able to protect the internal circuit 20, if the source-drain voltage of the transistor QP20 connected in parallel to the diode 1 to which the reverse voltage is applied is smaller than the breakdown voltage $V_{DMG}$ that leads to breakdown of the transistor QP20. To achieve this, the following equation (2) needs to be satisfied.

$$V_F + V_W + V_{PC} < V_{DMG} \quad (2)$$

Here, $V_F$ is the forward voltage of the diode 2, $V_W$ is the voltage that is produced when the surge current $I_{ESD}$ flows to the resistance component of the power supply interconnect 4, and $V_{PC}$ is the voltage that is produced when the surge current $I_{ESD}$ flows to the electrostatic protection circuit 10.

As is evident from equations (1) and (2), in the case shown in FIGS. 1 and 2, the condition for protecting the internal circuit 20 can be represented with the same equation. That is, the sum of the voltages that are produced in devices on the discharge path being smaller than the breakdown voltage $V_{DMG}$ that leads to breakdown of elements of the internal circuit 20 serves as a condition for protecting the internal circuit 20. Providing such an electrostatic protection circuit 10 enables breakdown of the internal circuit 20 due to electrostatic discharge or the like to be prevented in various types of semiconductor integrated circuit devices.

First Embodiment

Figure 3:
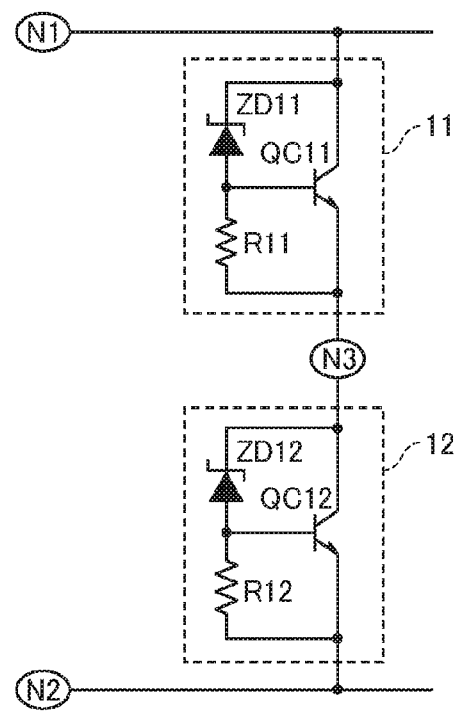
FIG. 3 is a circuit diagram showing an exemplary configuration of an electrostatic protection circuit according to a first embodiment of the invention.

FIG. 3 is a circuit diagram showing an exemplary configuration of the electrostatic protection circuit according to a first embodiment of the invention. As shown in FIG. 3, the electrostatic protection circuit according to the first embodiment includes a plurality of circuit blocks (e.g., discharge circuits or clamp circuits) connected in series between a node N1 and a node N2. Connecting a plurality of circuit blocks in series enables a high hold voltage to be set.

At least one circuit block out of the plurality of circuit blocks includes a zener diode for setting the trigger voltage, and enters a conduction state when the potential of the node N1 becomes higher than the potential of the node N2 and the voltage between both ends of a circuit block reaches the breakdown voltage of the zener diode. Furthermore, the trigger voltage and the hold voltage of the electrostatic protection circuit are set by connecting a plurality of circuit blocks in series.

Although two circuit blocks 11 and 12 connected in series between the node N1 and the node N2 are shown as an example in FIG. 3, three or more circuit blocks may be connected in series.

Here, the circuit block 11 includes an NPN bipolar transistor QC11, a resistance element R11, and a zener diode ZD11. The transistor QC11 has a collector connected to one end (node N1) of the circuit block 11, and an emitter connected to the other end (node N3) of the circuit block 11.

The resistance element R11 is connected between the base and the emitter of the transistor QC11. The zener diode ZD11 is connected between the collector and the base of the transistor QC11, and has a cathode connected to the collector of the transistor QC11 and an anode connected to the base of the transistor QC11.

The zener diode ZD11 allows current to flow to the resistance element R11 or to the base of the transistor QC11 when the potential of the node N1 becomes higher than the potential of the node N2 and the voltage between both ends of the circuit block 11 reaches the breakdown voltage (trigger voltage of the circuit block 11). That is, current flows to the resistance element R11, and current also flows to the base of the transistor QC11 when the base-emitter voltage of the transistor QC11 becomes greater than or equal to the threshold voltage. Because the transistor QC11 enters an ON state when current flows to the base of the transistor QC11, allowing current to flow from the node N1 to the node N3, the voltage between the node N1 and the node N3 is clamped. In this application, a configuration such as the circuit block 11 is referred to as a zener trigger bipolar transistor.

Similarly, the circuit block 12 includes an NPN bipolar transistor QC12, a resistance element R12, and a zener diode ZD12. The transistor QC12 has a collector connected to one end (node N3) of the circuit block 12 and an emitter connected to the other end (node N2) of the circuit block 12.

The resistance element R12 is connected between the base and the emitter of the transistor QC12. The zener diode ZD12 is connected between the collector and the base of the transistor QC12, and has a cathode connected to the collector of the transistor QC12 and an anode connected to the base of the transistor QC12.

The zener diode ZD12 allows current to flow to the resistance element R12 or to the base of the transistor QC12 when the potential of the node N1 becomes higher than the potential of the node N2 and the voltage between both ends of the circuit block 12 reaches the breakdown voltage (trigger voltage of the circuit block 12). That is, current flows to the resistance element R12, and current also flows to the base of the transistor QC12 when the base-emitter voltage of the transistor QC12 becomes greater than or equal to the threshold voltage. Because the transistor QC12 enters an ON state when current flows to the base of the transistor QC12, allowing current to flow from the node N3 to the node N2, the voltage between the node N3 and the node N2 is clamped.

Here, the transistors QC11 and QC12 may be lateral bipolar transistors and are formed in a P-well provided within a P-type semiconductor substrate (e.g., silicon substrate), the power supply potential VSS on the low potential side being supplied to the P-type semiconductor substrate and the node N2. In that case, because the emitter of the transistor QC12 is connected to the node N2, a typical twin well structure can be used, in order to form the transistor QC12. For example, the NPN bipolar transistor QC12 and the zener diode ZD12 of the circuit block 12 are formed in the P-well of the twin well structure. Also, the resistance element R12 is constituted by a resistance component of the P-well. An electrostatic protection circuit using an NPN lateral bipolar transistor formed in the P-well of the twin well structure is disclosed in FIG. 1 of 2001-345421 or the like.

On the other hand, because the emitter of the transistor QC11 needs to be electrically isolated from the node N2, a triple well structure is used, in order to form the transistor QC11. The triple well structure is, for example, a three-layer structure that is configured by forming an N-type embedded diffusion layer within the P-type semiconductor substrate, and further forming a P-well thereon. For example, the NPN bipolar transistor QC11 and the zener diode ZD11 of the circuit block 11 are formed in the P-well of the triple well structure. Also, the resistance element R11 is constituted by the resistance component of the P-well.

Figure 4:
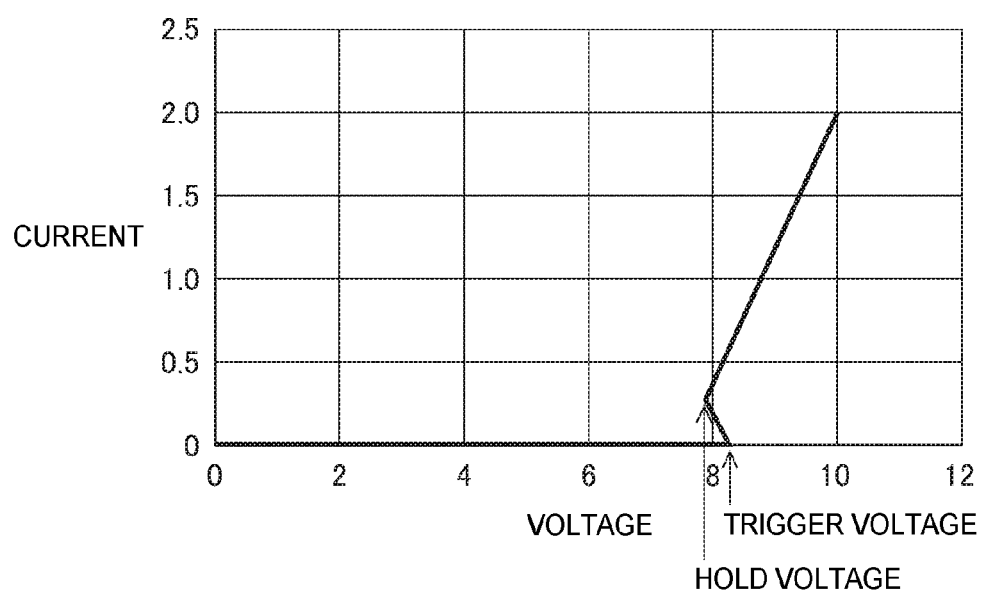
FIG. 4 is a diagram showing exemplary I-V characteristics of circuit blocks shown in FIG. 3.

FIG. 4 is a diagram showing exemplary I-V characteristics of the circuit block shown in FIG. 3. In FIG. 4, the horizontal axis represents voltage (V) and the vertical axis represents current (A). In the circuit blocks 11 and 12 shown in FIG. 3, ion doping of the zener diodes ZD11 and ZD12 is carried out, so that the breakdown voltages of the zener diodes ZD11 and ZD12 will be voltages approximating the respective hold voltages of the circuit blocks 11 and 12.

For example, in the circuit block 11 shown in FIG. 3, the zener diode ZD11 allows current to flow to the base of the transistor QC11 when the potential of the node N1 becomes higher than the potential of the node N2 and the voltage between both ends of the circuit block 11 reaches the breakdown voltage of the zener diode ZD11. Because the transistor QC11 thereby enters an ON state, allowing current to flow from the node N1 to the node N3, the voltage between the node N1 and the node N3 is clamped at the hold voltage. Thereafter, a rise in voltage between both ends of the circuit block 11 is suppressed, even when the current that flows from the node N1 to the node N3 increases.

Figure 5:
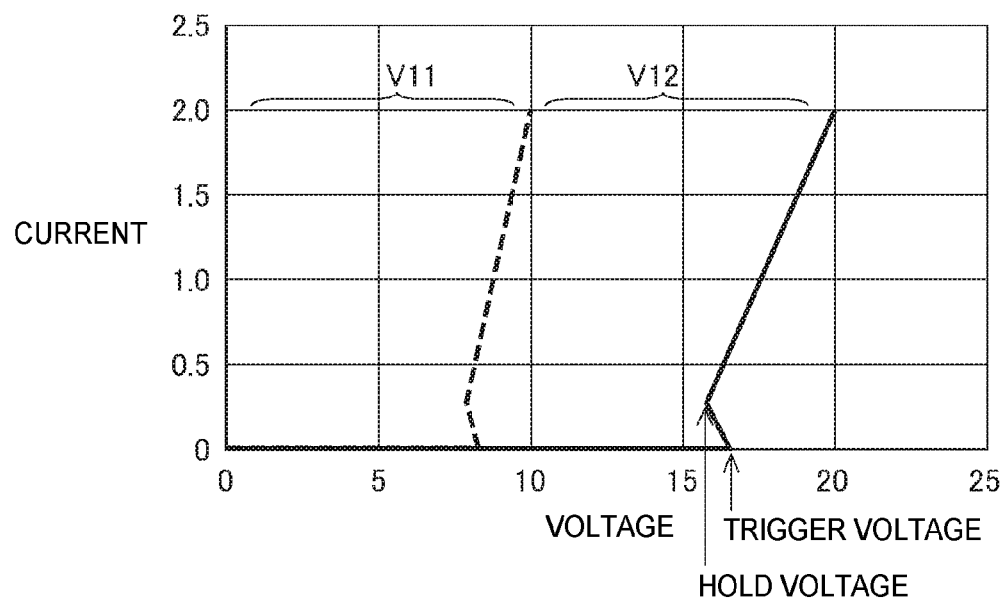
FIG. 5 is a diagram showing exemplary I-V characteristics of the electrostatic protection circuit shown in FIG. 3.

FIG. 5 is a diagram showing exemplary I-V characteristics of the electrostatic protection circuit shown in FIG. 3. In FIG. 5, the horizontal axis represents voltage (V) and the vertical axis represents current (A). Also, V11 denotes the voltage between both ends of the circuit block 11, and V12 denotes the voltage between both ends of the circuit block 12.

When FIG. 4 and FIG. 5 are compared, it is evident that the trigger voltage of the electrostatic protection circuit that is constituted by a plurality of circuit blocks connected in series will be the sum of the trigger voltages of the individual circuit blocks. Also, it is evident that the hold voltage of the electrostatic protection circuit that is constituted by a plurality of circuit blocks connected in series will be the sum of the hold voltages of the individual circuit blocks.

In the circuit blocks 11 and 12 shown in FIG. 3, ion doping of the zener diode is carried out such that the breakdown voltage of the zener diode will be a voltage approximating the hold voltage of the respective circuit block, and thus a relation in which the trigger voltage of the electrostatic protection circuit will be a voltage approximating the hold voltage is maintained, even when the circuit blocks 11 and 12 are connected in series.

Also, in the PN junction of the zener diodes ZD11 and ZD12, the impurity concentration of both the P-type impurity diffusion region and the N-type impurity diffusion region is high, and thus the leakage current is larger by one order or more (e.g., 1 nA to 10 nA) in comparison with the PN junction (P-well or N-well) that is formed for potential isolation. Accordingly, the ratio of the voltages that are applied to the circuit blocks 11 and 12 during normal operation is decided by the leakage current that flows through the zener diodes ZD11 and ZD12.

It is thereby possible to accurately prevent breakdown of the protected circuit immediately after power on, and to prevent breakdown or deterioration of the protection device during prolonged normal operation, without connecting a resistance element in parallel to a plurality of circuit blocks 11 and 12 connected in series in the electrostatic protection circuit. As a result, a resistance element for voltage division and an RC timer are no longer required, in comparison with the related technology shown in FIG. 9 of JP-A-2014-120547, thus enabling circuit area (chip size) to be reduced.

Second Embodiment

Figure 6:
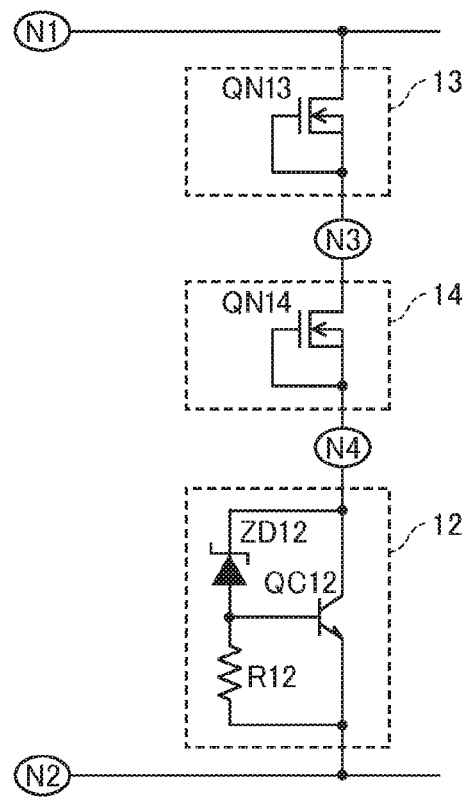
FIG. 6 is a circuit diagram showing an exemplary configuration of an electrostatic protection circuit according to a second embodiment of the invention.

FIG. 6 is a circuit diagram showing an exemplary configuration of an electrostatic protection circuit according to a second embodiment of the invention. In the second embodiment, circuit blocks 13 and 14 are provided, instead of the circuit block 11, in the electrostatic protection circuit according to the first embodiment shown in FIG. 3. In other respects, the second embodiment may be configured similarly to the first embodiment.

As shown in FIG. 6, the electrostatic protection circuit according to the second embodiment includes the circuit blocks 13, 14 and 12 connected in series between a node N1 and a node N2. The configuration shown in FIG. 6 is one example, and the number and connection order of the circuit blocks are arbitrary. For example, these circuit blocks may be connected in order of the circuit block 13, the circuit block 12 and the circuit block 14 from the node N1 side.

The circuit block 13 includes an N-channel MOS transistor QN13 in which the gate is connected to the source. The transistor QN13 has a drain connected to one end (node N1) of the circuit block 13 and a source and a gate connected to the other end (node N3) of the circuit block 13, and allows discharge current to flow when the potential of the node N1 becomes higher than the potential of the node N2 and the voltage between both ends of the circuit block 13 reaches the breakdown voltage.

Similarly, the circuit block 14 includes an N-channel MOS transistor QN14 in which the gate is connected to the source. The transistor QN14 has a drain connected to one end (node N3) of the circuit block 14 and a source and a gate connected to the other end (node N4) of the circuit block 14, and allows discharge current to flow when the potential of the node N1 becomes higher than the potential of the node N2 and the voltage between both ends of the circuit block 14 reaches the breakdown voltage.

In order to form the transistors QN13 and QN14 in the case of electrically isolating the source and the back gate (P-well) of the transistors QN13 and QN14 from the node N2, a triple well structure is used.

Also, a transistor having a leakage current that, while comparatively high, is smaller than the zener trigger bipolar transistor of the circuit block 12 is used as the transistors QN13 and QN14. Because the PN junction of the transistors QN13 and QN14 is constituted by a P-well and an $N^+$ impurity diffusion region, whereas the PN junction of the zener diode is constituted by a $P^+$ impurity diffusion region and an $N^+$ impurity diffusion region, the zener trigger bipolar transistor has a larger leakage current.

Accordingly, the ratio of the voltages that are applied to the circuit blocks 13, 14 and 12 during normal operation is decided by the leakage current that flows through those circuit blocks. It is thereby possible to accurately prevent breakdown of the protected circuit immediately after power on, and to prevent breakdown or deterioration of the protection device during prolonged normal operation, without connecting a resistance element in parallel to those circuit blocks. As a result, a resistance element for voltage division and an RC timer are no longer required, in comparison with the related technology shown in FIG. 9 of JP-A-2014-120547, thus enabling circuit area (chip size) to be reduced.

Figure 7A:
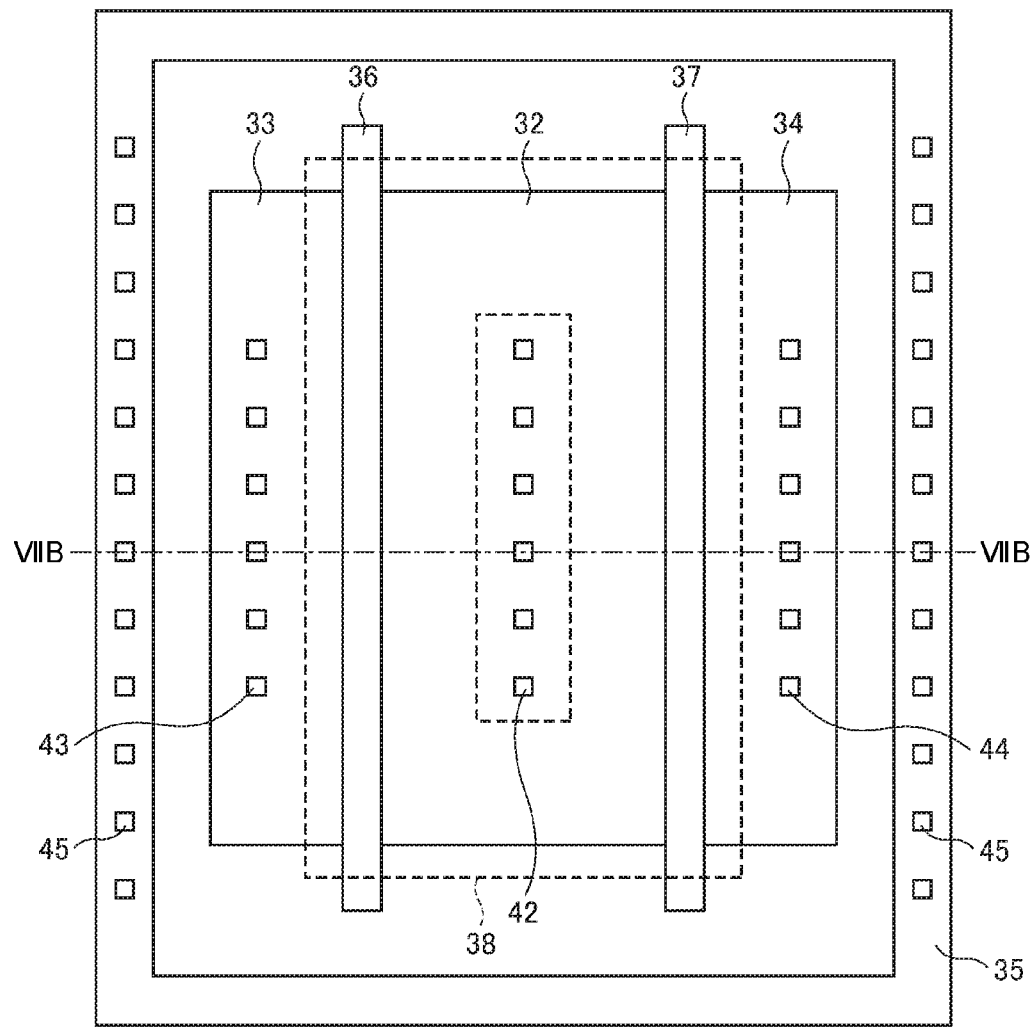
FIGS. 7A and 7B are diagrams showing a first exemplary layout of an N-channel MOS transistor shown in FIG. 6.
Figure 7B:
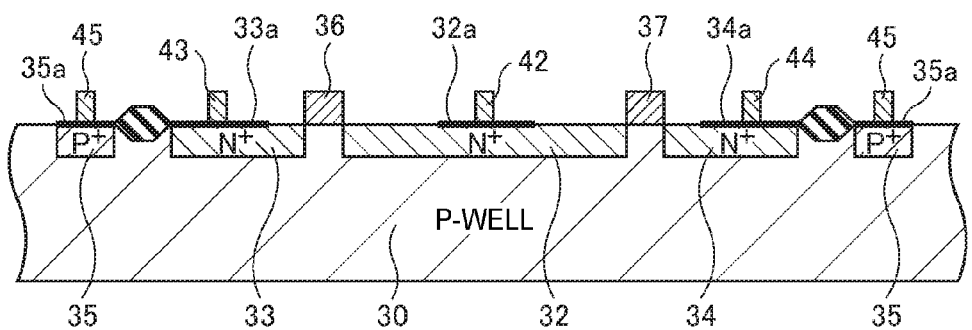

FIGS. 7A and 7B are diagrams showing a first exemplary layout of the N-channel MOS transistor shown in FIG. 6. FIG. 7A is a plan view, and FIG. 7B is a cross-sectional view along VIIB-VIIB shown in FIG. 7A.

As shown in FIGS. 7A and 7B, within a P-well 30 are formed an $N^+$ impurity diffusion region 32 serving as the drain of the N-channel MOS transistor, $N^+$ impurity diffusion regions 33 and 34 serving as the source, and a $P^+$ impurity diffusion region 35 for providing a potential to the P-well 30. Also, on the P-well 30 are formed gate electrodes 36 and 37 made of polysilicon or the like, via a gate insulation film (not shown). Although two gate electrodes 36 and 37 are shown in FIGS. 7A and 7B, a configuration may be adopted in which three or more gate electrodes are provided.

Contacts 42 to 45 are respectively electrically connected to the impurity diffusion regions 32 to 35. In the $N^+$ impurity diffusion regions 32 to 34 serving as the drain and the source of the N-channel MOS transistor, predetermined regions 32a to 34a including the portions that the contacts 42 to 44 contact are silicided, and a remaining region 38 thereof is not silicided. Also, in the $P^+$ impurity diffusion region 35, a region 35a including the portion that the contact 45 contacts is silicided.

It is known that, in the case where a silicide layer exists on the impurity diffusion region of a discharge element such as a transistor, breakdown of the discharge element occurs at an extremely low applied voltage. Given that, in exfoliation analysis results, there are signs that current flowed in a notched shape in proximity to the gate electrodes of a MOS transistor in which breakdown has occurred, it is thought that the cause of the breakdown was a local concentration of current produced in that region. The resistance of the impurity diffusion region being lowered due to silicide technology is cited as a reason that local concentrations of current tend to be produced.

For example, in the case where a reverse voltage is applied to an N-channel MOS transistor, electric charge injected from a pad (terminal) is injected into an $N^+$ impurity diffusion region from the contact on the drain, and avalanche breakdown (electron avalanche) is induced at the junction of the $N^+$ impurity diffusion region and the P-well (channel region). Due to the electric charge that flows within the channel region, a potential difference required for the forward current of the diode to flow occurs then between the channel potential and the source potential (reference potential), a parasitic bipolar transistor that is formed with a drain, channel and source operates, and discharge is performed in a state where the applied voltage is clamped.

Because the specific resistance of the impurity diffusion regions of the N-channel MOS transistor serving as a discharge element is large in the case where a silicide layer does not exist on the impurity diffusion regions, uniform discharge is performed toward the gate electrodes from the contact on the drain without concentrating at one point, and breakdown of the discharge element thus does not readily occur. In view of this, in this embodiment, a region 38 that has not been silicided is provided in the $N^+$ impurity diffusion regions 32 to 34 serving as the drain and the source of the N-channel MOS transistor, as shown in FIGS. 7A and 7B. The breakdown current of the electrostatic protection circuit can thereby be increased, improving the electrostatic breakdown strength.

Figure 8A:
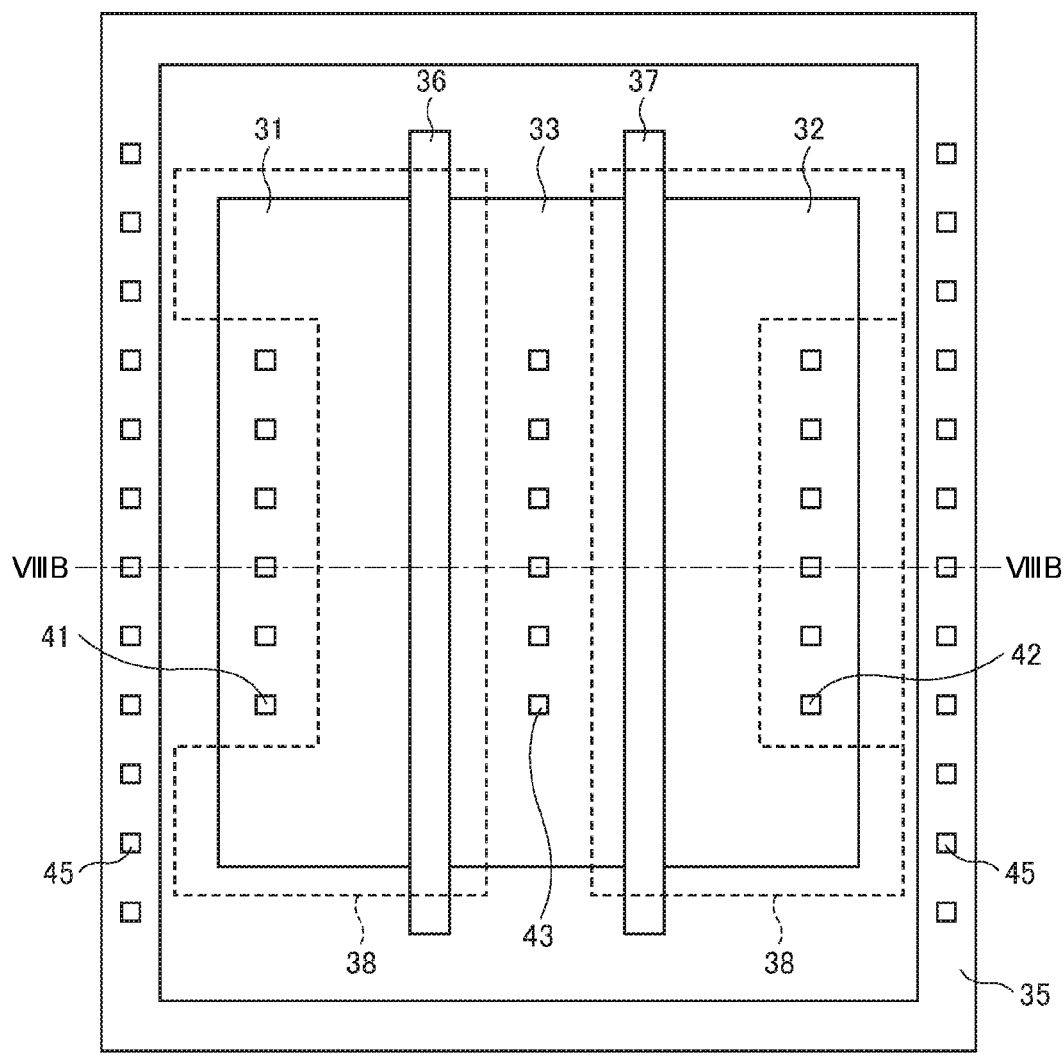
FIGS. 8A and 8B are diagrams showing a second exemplary layout of the N-channel MOS transistor shown in FIG. 6.
Figure 8B:
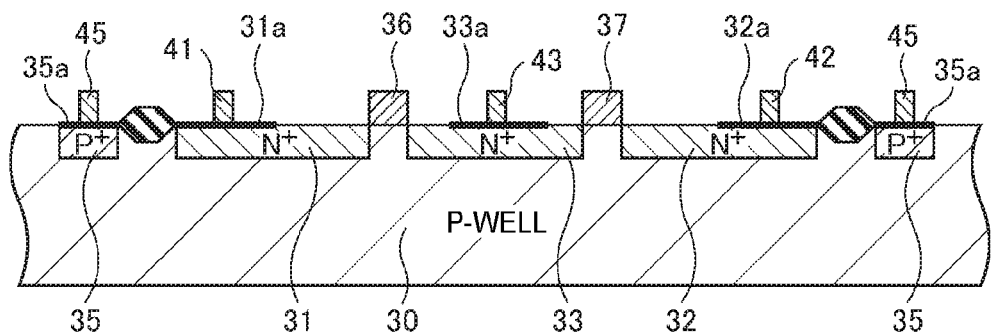

FIGS. 8A and 8B are diagrams showing a second exemplary layout of the N-channel MOS transistor shown in FIG. 6. FIG. 8A is a plan view, and FIG. 8B is a cross-sectional view along VIIIB-VIIIB shown in FIG. 8A. In the second exemplary layout, the positions of the drain and the source in the first exemplary layout shown in FIGS. 7A and 7B are reversed.

As shown in FIGS. 8A and 8B, within a P-well 30 are formed $N^+$ impurity diffusion regions 31 and 32 serving as the drain of the N-channel MOS transistor, an $N^+$ impurity diffusion region 33 serving as the source, and a $P^+$ impurity diffusion region 35 for providing a potential to the P-well 30. Also, on the P-well 30 are formed gate electrodes 36 and 37 made of polysilicon or the like, via a gate insulation film (not shown).

Contacts 41 to 43 and 45 are respectively electrically connected to the impurity diffusion regions 31 to 33 and 35. In the $N^+$ impurity diffusion regions 31 to 33 serving as the drain and the source of the N-channel MOS transistor, predetermined regions 31a to 33a including the portion that the contacts 41 to 43 contact are silicided, and a remaining region 38 thereof is not silicided. When the drain is arranged on the outer side, as in the second exemplary layout, the diode that is formed between the P-well and the drain also serves as a discharge path, and acts in the direction in which the on-resistance of the N-channel MOS transistor decreases.

Figure 9:
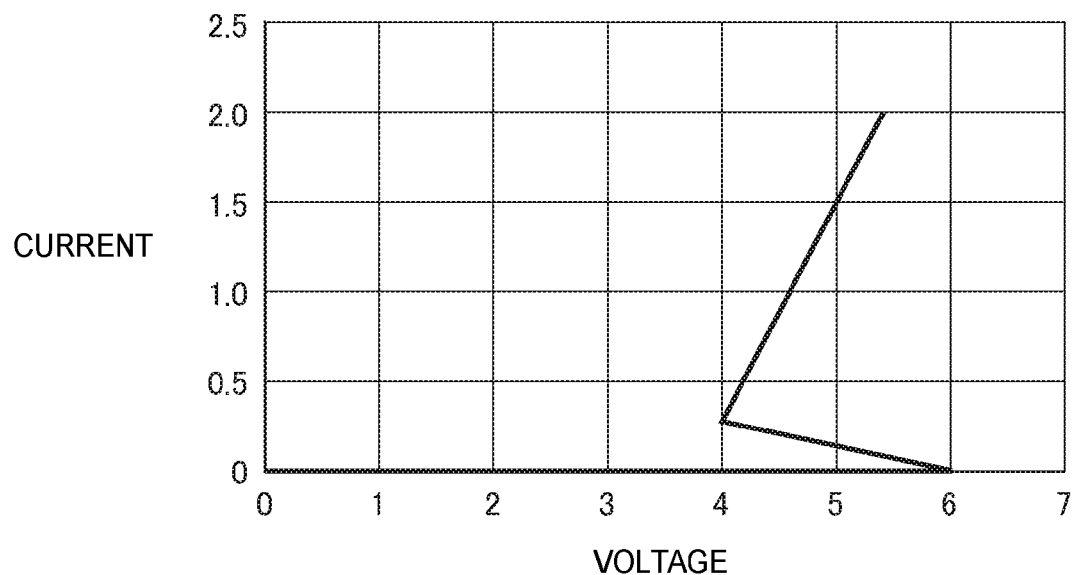
FIG. 9 is a diagram showing exemplary I-V characteristics of the N-channel MOS transistor shown in FIG. 6.

FIG. 9 is a diagram showing exemplary I-V characteristics of the N-channel MOS transistor shown in FIG. 6. In FIG. 9, the horizontal axis represents voltage (V) and the vertical axis represents current (A). For example, in the circuit block 13 shown in FIG. 6, the transistor QN13 allows current to flow from the node N1 to the node N3 when the potential of the node N1 becomes higher than the potential of the node N2 and the voltage between both ends of the circuit block 13 reaches the breakdown voltage (trigger voltage of the circuit block 13) of the transistor QN13. The voltage between the node N1 and the node N3 is thereby clamped at the hold voltage. Thereafter, a rise in voltage between both ends of the circuit block 11 is suppressed, even when the current that flows from the node N1 to the node N3 increases.

Figure 10:
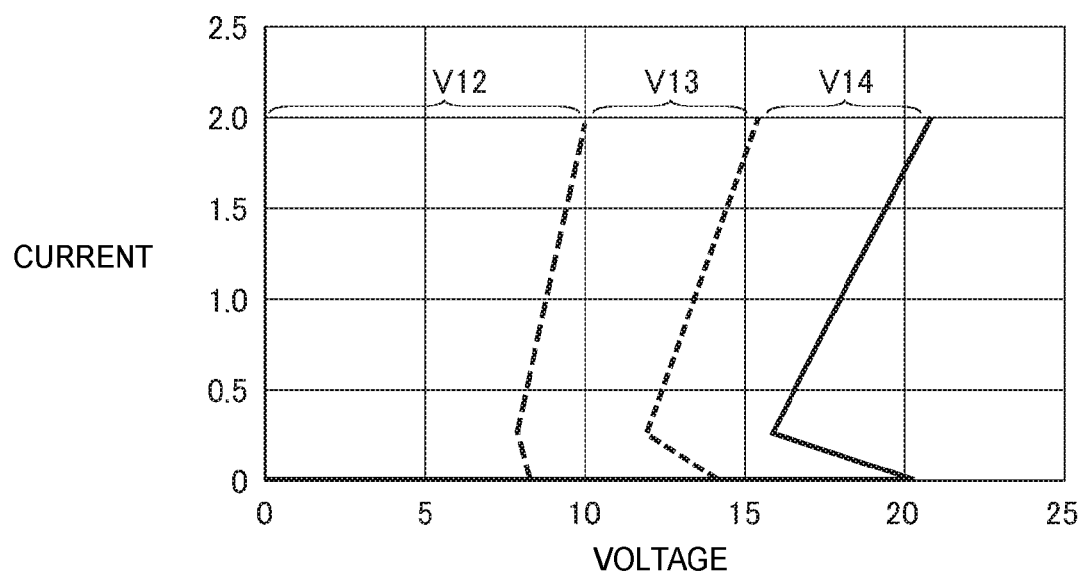
FIG. 10 is a diagram showing a first example of I-V characteristics of the electrostatic protection circuit shown in FIG. 6.

FIG. 10 is a diagram showing a first example of I-V characteristics of the electrostatic protection circuit shown in FIG. 6. In FIG. 10, the horizontal axis represents voltage (V) and the vertical axis represents current (A). As shown in FIG. 10, the voltage between both ends of the electrostatic protection circuit shown in FIG. 6 will be a voltage obtained by adding a voltage V13 between both ends of the circuit block 13 and a voltage V14 between both ends of the circuit block 14 to a voltage V12 between both ends of the circuit block 12.

The electrostatic protection circuit shown in FIG. 6 is desirably used in a smaller voltage range than the breakdown voltage of two stages of N-channel MOS transistors. The drain-source voltage of the N-channel MOS transistor will thereby be less than or equal to the respective maximum operating voltages, immediately after power on and during prolonged normal operation.

In the circuit block 13 or 14, in the case of using a MOS transistor having a low breakdown voltage, the trigger voltage and the hold voltage of the circuit block 13 or 14 are characterized in being relatively low. Accordingly, by using a MOS transistor having a low breakdown voltage, the trigger voltage and the hold voltage of the electrostatic protection circuit can be finely set according to the specification of the power supply voltage, in comparison with the electrostatic protection circuit shown in FIG. 3.

Hereinafter, the case where the leakage current of the circuit block 12 is ten times larger than the respective leakage currents of the circuit blocks 13 and 14, in the case where the same voltage is applied to the circuit blocks 12 to 14, will be described as an example. Note that, in order to simplify the description, leakage current is assumed to be linear with respect to the power supply voltage.

Figure 11:
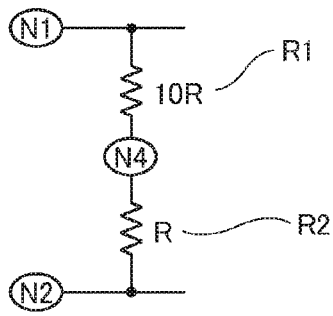
FIG. 11 is a circuit diagram showing an equivalent circuit during normal operation of the electrostatic protection circuit shown in FIG. 6.

FIG. 11 is a circuit diagram showing an equivalent circuit during normal operation of the electrostatic protection circuit shown in FIG. 6. In FIG. 11, a resistor R1 represents the transistors QN13 and QN14 connected in series, and has a resistance value 10R. Also, a resistor R2 represents the zener trigger bipolar transistor of the circuit block 12, and has a resistance value R.

Figure 12:
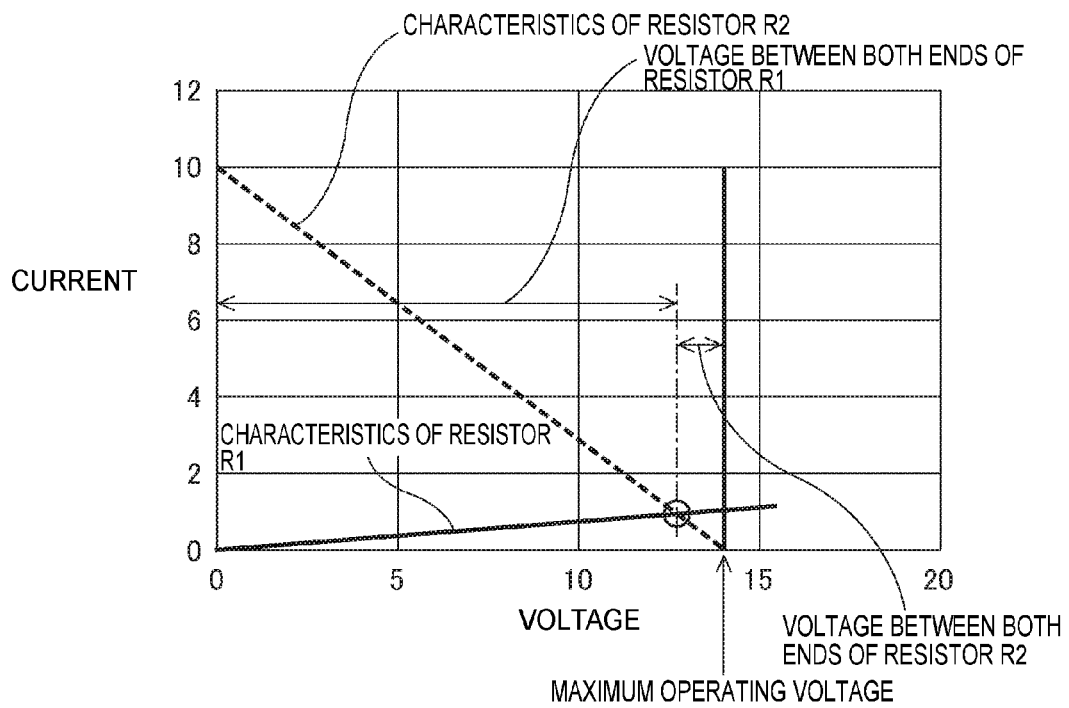
FIG. 12 is a diagram showing exemplary I-V characteristics of the equivalent circuit shown in FIG. 11.

FIG. 12 is a diagram showing exemplary I-V characteristics of the equivalent circuit shown in FIG. 11. In FIG. 12, the horizontal axis represents voltage (V) that is applied to both ends of the resistor R1, and the vertical axis represents the leakage current (in arbitrary units) that flows through the resistor R1 or R2. Also, the solid line indicates the characteristics of the resistor R1, and the dashed line indicates the characteristics of the resistor R2. The sum total of voltages that are applied to the resistors R1 and R2 connected in series is a constant value (maximum operating voltage).

In FIG. 12, the leakage current that flows when a voltage of 14 V is applied between both ends of the resistor R1 is 1, and the leakage current that flows when a voltage of 14 V is applied between both ends of the resistor R2 is 10. The point that is shown with the O mark will be the operating point, under the condition that the current that flows to the resistor R1 and the current that flows to the resistor R2 are equal, because of the resistors R1 and R2 being connected in series.

Accordingly, the voltage that is applied between both ends of the resistor R1 will be less than or equal to the maximum operating voltage of the transistors QN13 and QN14 connected in series. Because the characteristics of the transistors QN13 and QN14 are the same, the voltage that is applied between the drain and the source of each transistor will be less than or equal to half of the maximum operating voltage. Assuming that the maximum operating voltage of each transistor is 7 V, a deterioration in characteristics or breakdown of the transistors QN13 and QN14 does not result, since the drain-source voltage of the transistors QN13 and QN14 does not exceed the respective maximum operating voltages, during normal operation.

Third Embodiment

Figure 13:
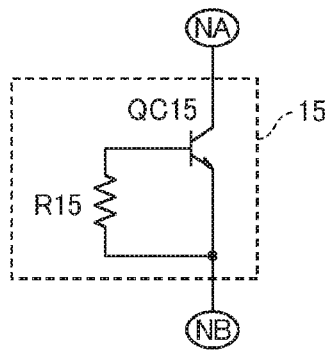
FIG. 13 is a circuit diagram showing a circuit block that is used in a third embodiment of the invention.

FIG. 13 is a circuit diagram showing an exemplary configuration of circuit blocks that are used in a third embodiment of the invention. In the third embodiment, a circuit block 15 shown in FIG. 13 is used, instead of the circuit block 13 or 14, in the electrostatic protection circuit according to the second embodiment shown in FIG. 6. In other respects, the third embodiment may be configured similarly to the second embodiment.

As shown in FIG. 13, the circuit block 15 includes an NPN bipolar transistor QC15 and a resistance element R15. The transistor QC15 has a collector connected to one end (node NA) of the circuit block 15 and an emitter connected to the other end (node NB) of the circuit block 15. Also, the resistance element R15 is connected between the base and the emitter of the transistor QC15. The transistor QC15 allows discharge current to flow when the potential of the node N1 becomes higher than the potential of the node N2 and the voltage between both ends of the circuit block 15 reaches the breakdown voltage.

In the case of using the bipolar transistor QC15 having a low breakdown voltage in the circuit block 15, the trigger voltage and the hold voltage of the circuit block 15 are characterized in being relatively low. Accordingly, by using the bipolar transistor QC15 having a low breakdown voltage, the trigger voltage and the hold voltage of the electrostatic protection circuit can be finely set according to the specification of the power supply voltage, in comparison with the electrostatic protection circuit shown in FIG. 3.

Figure 14A:
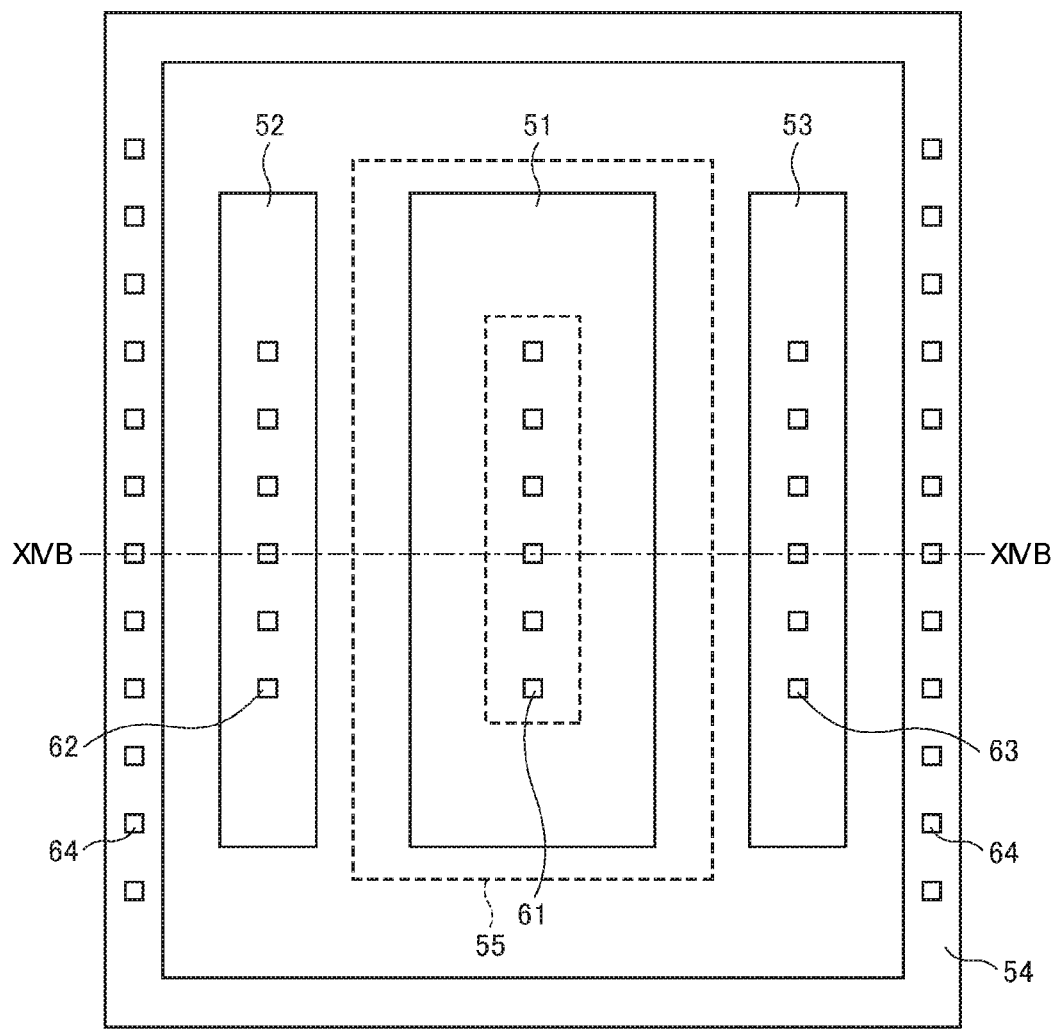
FIGS. 14A and 14B are diagram showing an exemplary layout of an NPN bipolar transistor shown in FIG. 13.
Figure 14B:
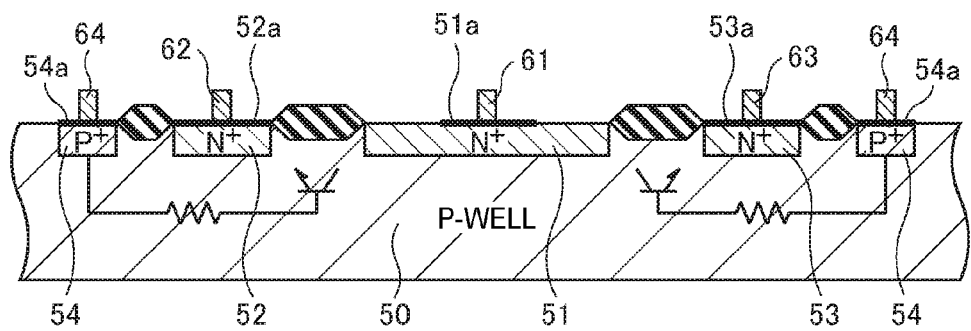

FIGS. 14A and 14B are diagram showing an exemplary layout of the NPN bipolar transistor shown in FIG. 13. FIG. 14A is a plan view, and FIG. 14B is a cross-sectional view along XIVB-XIVB shown in FIG. 14A.

As shown in FIGS. 14A and 14B, within a P-well 50 serving as the base of the NPN bipolar transistor are formed an $N^+$ impurity diffusion region 51 serving as the collector, $N^+$ impurity diffusion regions 52 and 53 serving as the emitter, and a $P^+$ impurity diffusion region 54 for providing a potential to the P-well 50. Also, the resistance element that is connected between the base and the emitter of the NPN bipolar transistor is constituted by a resistance component of the P-well 50.

Contacts 61 to 64 are respectively electrically connected to the impurity diffusion regions 51 to 54. In the $N^+$ impurity diffusion region 51 serving as the collector of the NPN bipolar transistor, a predetermined region 51a including the portion that the contact 61 contacts is silicided, and a remaining region 55 thereof is not silicided.

Also, in the $N^+$ impurity diffusion regions 52 and 53 serving as the emitter of the NPN bipolar transistor, regions 52a and 53a including the portion that the contacts 62 and 63 contact are silicided, and, in the $P^+$ impurity diffusion region 54, a region 54a including the portion that the contact 64 contacts is silicided.

In the case where a silicide layer does not exist on the impurity diffusion regions of the NPN bipolar transistor serving as a discharge element, the resistance value of the impurity diffusion regions is large, and thus breakdown of the discharge element thus does not readily occur, as a result uniform discharge being performed toward the emitter from the contact on the collector, without concentrating at one point. In view of this, in this embodiment, a region 55 that has not been silicided is provided in the $N^+$ impurity diffusion region 51 serving as the collector of the NPN bipolar transistor, as shown in FIGS. 14A and 14B. The breakdown current of the electrostatic protection circuit can thereby be increased, improving the electrostatic breakdown strength.

Fourth Embodiment

In a fourth embodiment, the trigger voltage of the zener trigger bipolar transistor of the circuit block 12 is set lower than the hold voltage, in the electrostatic protection circuit according to the second embodiment shown in FIG. 6. In other respects, the fourth embodiment may be configured similarly to the second embodiment.

Figure 15:
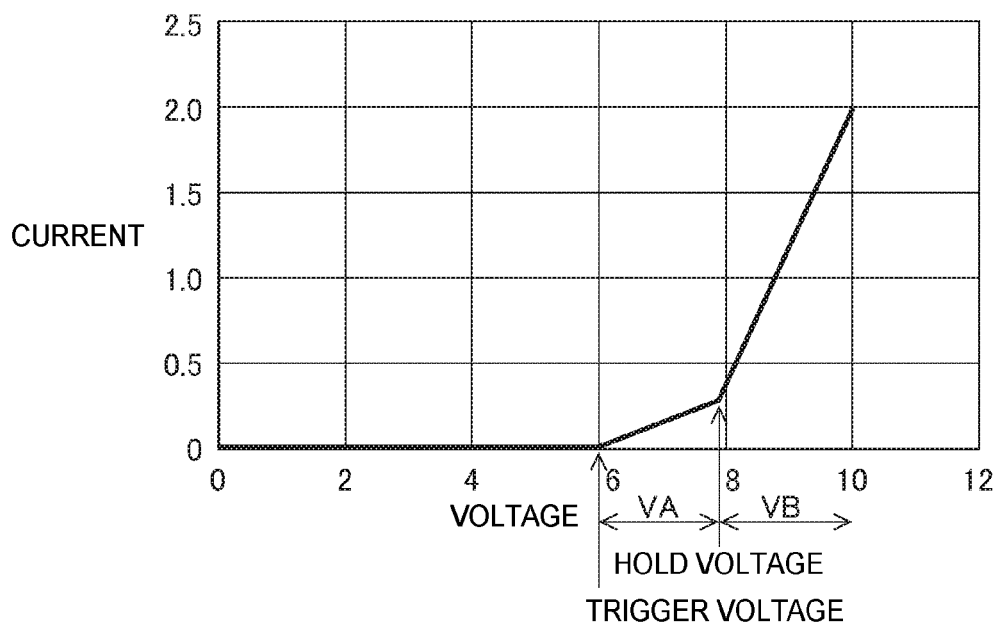
FIG. 15 is a diagram showing exemplary I-V characteristics of a zener trigger bipolar transistor.
Figures 16A, 16B:
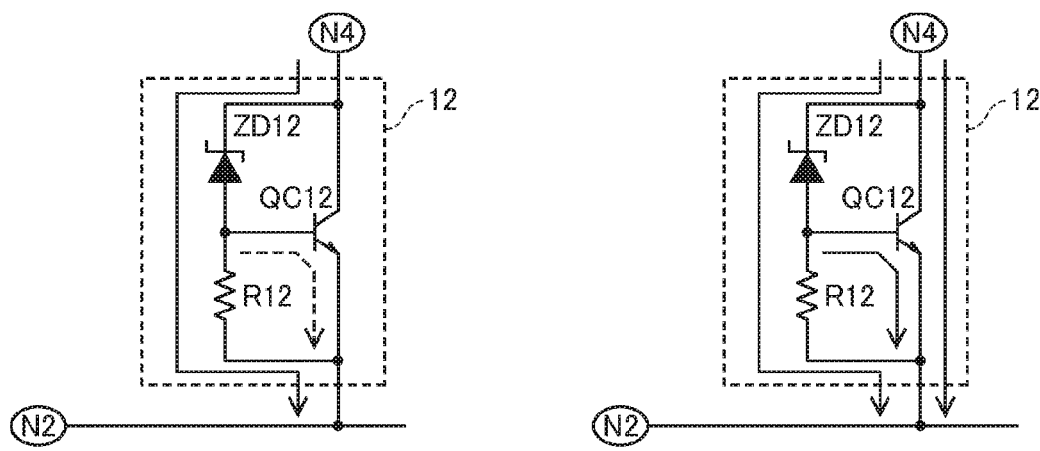
FIGS. 16A and 16B are diagrams showing the discharge path in the zener trigger bipolar transistor.

FIG. 15 is a diagram showing a second example of I-V characteristics of the zener trigger bipolar transistor shown in FIG. 6. In FIG. 15, the horizontal axis represents voltage (V) and the vertical axis represents current (A). FIGS. 16A and 16B are diagrams showing the discharge path in the zener trigger bipolar transistor shown in FIG. 6. FIG. 16A shows the discharge path in a voltage range VA shown in FIG. 15, and FIG. 16B shows the discharge path in a voltage range VB shown in FIG. 15.

Current flows through the zener diode ZD12 when the potential of the node N1 becomes higher than the potential of the node N2 and the voltage between both ends of the circuit block 12 reaches the breakdown voltage (trigger voltage) of the zener diode ZD12, as shown in FIG. 15. In the voltage range VA, however, the transistor QC12 is in an OFF state, because current mainly flows to the resistance element R12, and current hardly flows to the base of the transistor QC12, as shown in FIG. 16A. On the other hand, in the voltage range VB after the voltage between both ends of the circuit block 12 has reached the hold voltage, the transistor QC12 enters an ON state, since current also flows to the base of the transistor QC12, as shown in FIG. 16B.

In the zener trigger bipolar transistor shown in FIG. 6, the breakdown voltage of the zener diode ZD12 can be adjusted through ion doping. Accordingly, it is possible to form a circuit block in which the trigger voltage is set lower than the hold voltage, by adopting a configuration that controls the base current of the bipolar transistor QC12 using the zener diode ZD12 and the resistance element R12.

Figure 17:
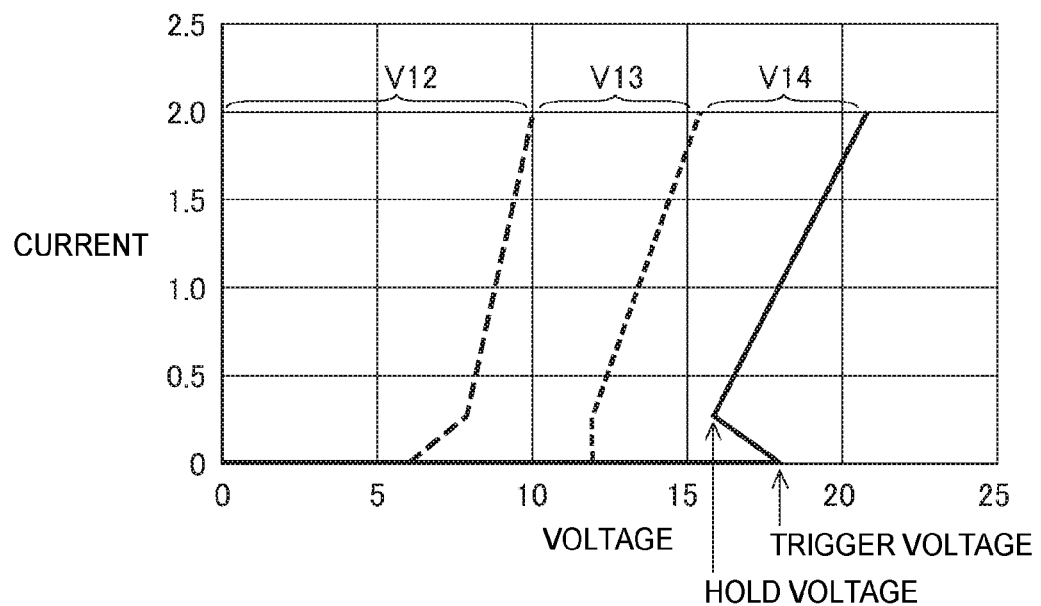
FIG. 17 is a diagram showing a second example of I-V characteristics of the electrostatic protection circuit shown in FIG. 6.

FIG. 17 is a diagram showing a second example of I-V characteristics of the electrostatic protection circuit shown in FIG. 6. In FIG. 17, the horizontal axis represents voltage (V) and the vertical axis represents current (A). As shown in FIG. 17, the voltage between both ends of the electrostatic protection circuit shown in FIG. 6 will be a voltage obtained by adding a voltage V13 between both ends of the circuit block 13 and a voltage V14 between both ends of the circuit block 14 to a voltage V12 between both ends of the circuit block 12.

According to the fourth embodiment, the trigger voltage of the overall electrostatic protection circuit can be set to a voltage approximating the hold voltage, by adjusting the breakdown voltage of the zener diode ZD12 of the circuit block 12 through ion doping.

Fifth Embodiment

Figure 18:
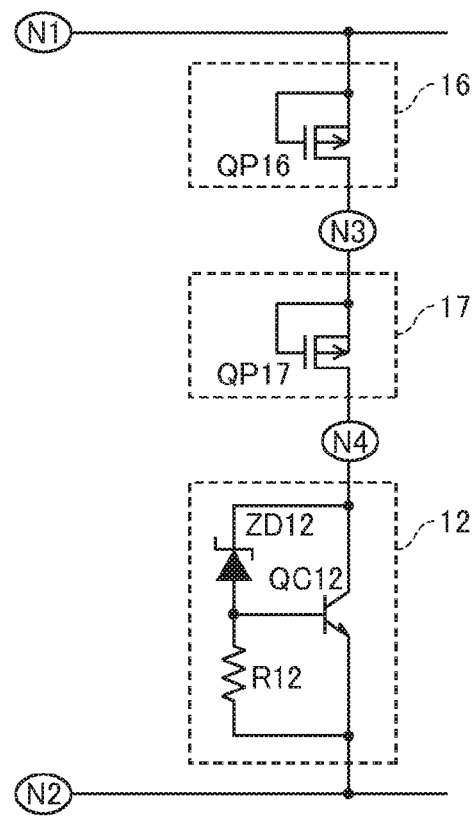
FIG. 18 is a circuit diagram showing an exemplary configuration of an electrostatic protection circuit according to a fifth embodiment of the invention.

FIG. 18 is a circuit diagram showing an exemplary configuration of an electrostatic protection circuit according to a fifth embodiment of the invention. In the fifth embodiment, circuit blocks 16 and 17 are provided, instead of the circuit blocks 13 and 14, in the electrostatic protection circuit according to the second embodiment shown in FIG. 6. In other respects, the fifth embodiment may be configured similarly to the second embodiment.

As shown in FIG. 18, the electrostatic protection circuit according to the fifth embodiment includes the circuit blocks 16, 17 and 12 connected in series between a node N1 and a node N2. The configuration shown in FIG. 18 is one example, and the number and connection order of the circuit blocks are arbitrary. For example, these circuit blocks may be connected in order of the circuit block 16, the circuit block 12 and the circuit block 17 from the node N1 side.

The circuit block 16 includes a P-channel MOS transistor QP16 in which the gate is connected to the source. The transistor QP16 has a source and a gate connected to one end (node N1) of the circuit block 16 and a drain connected to the other end (node N3) of the circuit block 16, and allows discharge current to flow when the potential of the node N1 becomes higher than the potential of the node N2 and the voltage between both ends of the circuit block 16 reaches the breakdown voltage.

Similarly, the circuit block 17 includes a P-channel MOS transistor QP17 in which the gate is connected to the source. The transistor QP17 is connected to one end (node N3) of the circuit block 17 and a drain connected to the other end (node N4) of the circuit block 17, and allows discharge current to flow when the potential of the node N1 becomes higher than the potential of the node N2 and the voltage between both ends of the circuit block 17 reaches the breakdown voltage.

In the case where the circuit blocks 16 and 17 are constituted by a P-channel MOS transistor, as in this embodiment, a P-channel MOS transistor need only be form in an N-well provided within the P-type semiconductor substrate, without needing to use a triple well structure, thus enabling the P-channel MOS transistor to be formed using a twin well structure. As a result, it becomes possible to realize the electrostatic protection circuit according to the invention, without increasing the cost of the semiconductor manufacturing process.

Figure 19:
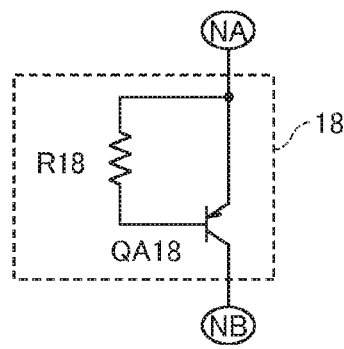
FIG. 19 is a circuit diagram showing a circuit block that is used in a modification of the fifth embodiment.

Alternatively, as a modification of the fifth embodiment, a circuit block 18 shown in FIG. 19 may be provided, instead of the circuit block 16 or 17, in the electrostatic protection circuit according to the fifth embodiment shown in FIG. 18.

FIG. 19 is a circuit diagram showing an exemplary configuration of circuit blocks that are used in a modification of the fifth embodiment of the invention. As shown in FIG. 19, the circuit block 18 includes a PNP bipolar transistor QA18 and a resistance element R18.

The transistor QA18 has an emitter connected to one end (node NA) of the circuit block 18 and a collector connected to the other end (node NB) of the circuit block 18. Also, the resistance element R18 is connected between the base and the emitter of the transistor QA18. The transistor QA18 allows discharge current to flow when the potential of the node N1 becomes higher than the potential of the node N2 and the voltage between both ends of the circuit block 18 reaches the breakdown voltage.

Figure 20:
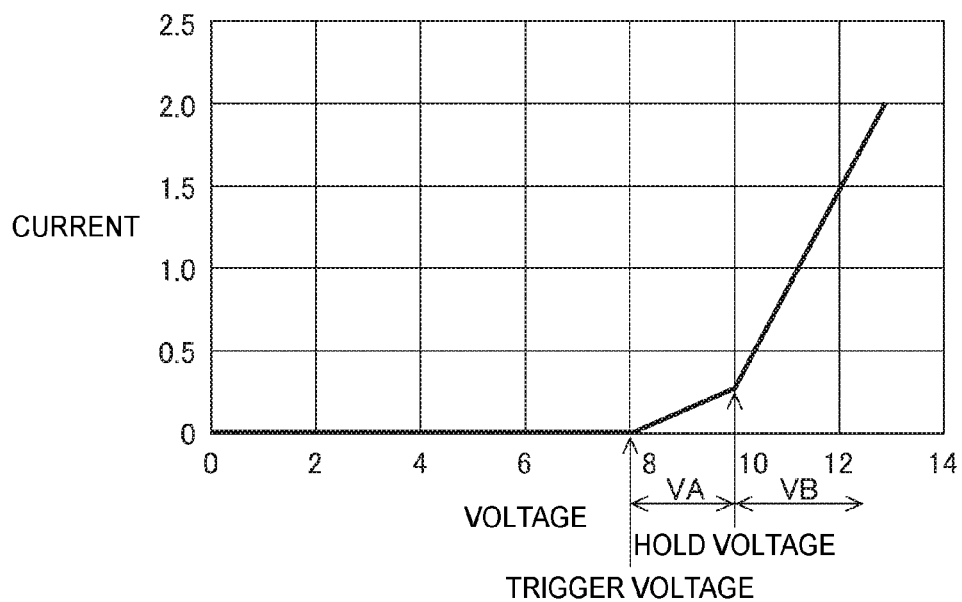
FIG. 20 is a diagram showing exemplary I-V characteristics of a P-channel transistor shown in FIG. 18.
Figures 21A, 21B:
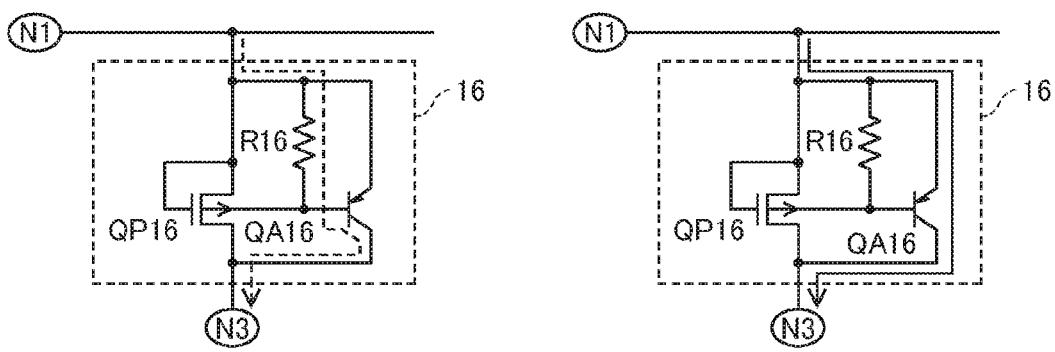
FIGS. 21A and 21B are diagrams showing the discharge path in an equivalent circuit of the P-channel transistor shown in FIG. 18.

FIG. 20 is a diagram showing exemplary I-V characteristics of the P-channel transistor shown in FIG. 18. In FIG. 20, the horizontal axis represents voltage (V) and the vertical axis represents current (A). FIGS. 21A and 21B are diagrams showing the discharge path in an equivalent circuit of the P-channel transistor shown in FIG. 18. FIG. 21A shows the discharge path in the voltage range VA shown in FIG. 20, and FIG. 21B shows the discharge path in the voltage range VB shown in FIG. 20.

Hereinafter, the transistor QP16 of the circuit block 16 will be described as an example. As shown in FIGS. 21A and 21B, the equivalent circuit of the transistor QP16 includes a parasitic PNP bipolar transistor QA16 and a resistance element R16 that is formed with a resistance component of the N-well.

Current flows through the transistor QP16 when the potential of the node N1 becomes higher than the potential of the node N2 and the voltage between both ends of the circuit block 16 reaches the breakdown voltage (trigger voltage) of the transistor QP16, as shown in FIG. 20. In the voltage range VA, however, the transistor QP16 does not reach a snapback state, even though current flows to the base of the parasitic transistor QA16 via the resistance element R16, as shown in FIG. 21A.

In the voltage range VB from the point at which the voltage between both ends of the circuit block 16 reached the hold voltage, current flows from the emitter of the parasitic transistor QA16 to the base and the collector, and the parasitic transistor QA16 enters an ON state, as shown in FIG. 21B. The transistor QP16 is thereby in a snapback state.

Figure 22:
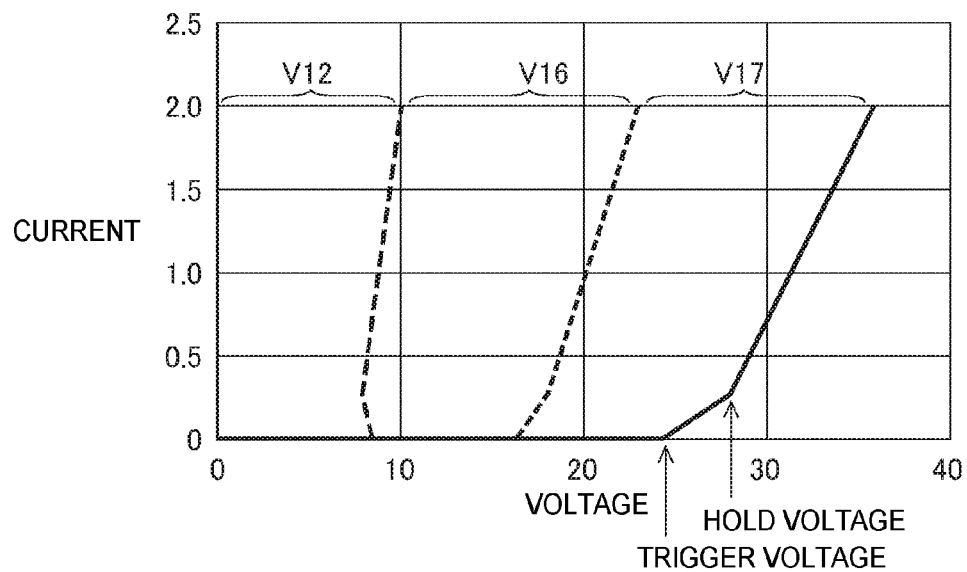
FIG. 22 is a diagram showing exemplary I-V characteristics of the electrostatic protection circuit shown in FIG. 18.

FIG. 22 is a diagram showing exemplary I-V characteristics of the electrostatic protection circuit shown in FIG. 18. In FIG. 22, the horizontal axis represents voltage (V) and the vertical axis represents current (A). The characteristics of the circuit block 12 are similar to the characteristics shown in FIG. 4. As shown in FIG. 22, the voltage between both ends of the electrostatic protection circuit shown in FIG. 18 will be a voltage obtained by adding a voltage V16 between both ends of the circuit block 16 and a voltage V17 between both ends of the circuit block 17 to a voltage V12 between both ends of the circuit block 12. In the fifth embodiment, the trigger voltage of the electrostatic protection circuit is set lower than the hold voltage. Accordingly, the electrostatic protection circuit need only be used such that the trigger voltage is higher than the power supply voltage.

Sixth Embodiment

The bipolar transistor of the circuit block 12 that is used in the fifth embodiment has a high hold voltage in comparison with a thyristor, although there is a limit to increasing the breakdown voltage of a zener diode. That is, the breakdown voltage of a zener diode cannot be set higher than a bipolar transistor in which ion doping has not been carried out. In view of this, in the sixth embodiment, a thyristor is used instead of a bipolar transistor.

Figure 23:
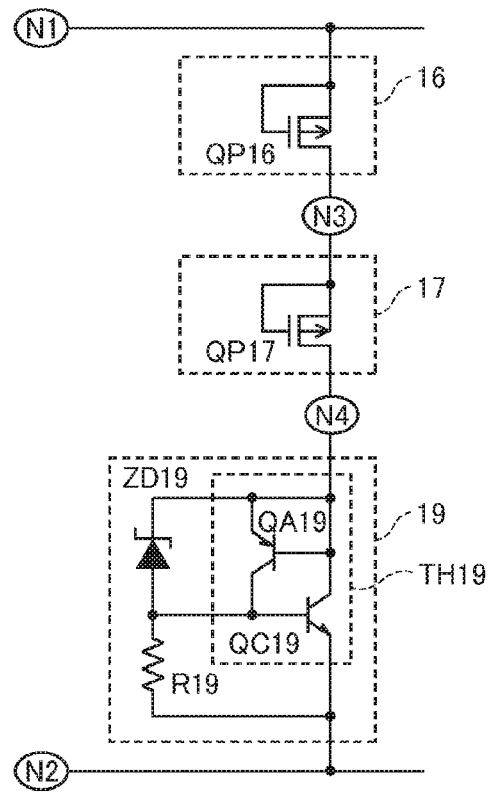
FIG. 23 is a circuit diagram showing an exemplary configuration of an electrostatic protection circuit according to a sixth embodiment of the invention.

FIG. 23 is a circuit diagram showing an exemplary configuration of an electrostatic protection circuit according to the sixth embodiment of the invention. In the sixth embodiment, a circuit block 19 is provided, instead of the circuit block 12, in the electrostatic protection circuit according to the fifth embodiment shown in FIG. 18. In other respects, the sixth embodiment may be configured similarly to the fifth embodiment.

As shown in FIG. 23, the electrostatic protection circuit according to the sixth embodiment includes the circuit blocks 16, 17 and 19 connected in series between a node N1 and a node N2. The configuration shown in FIG. 23 is one example, and the number and connection order of the circuit blocks are arbitrary. For example, these circuit blocks may be connected in order of the circuit block 16, the circuit block 19 and the circuit block 17 from the node N1 side.

The circuit block 19 includes a thyristor TH19 and a resistance element R19a, and a resistance element R19b. The thyristor TH19 is constituted by a PNP bipolar transistor QA19 and an NPN bipolar transistor QC19. Here, the emitter of the transistor QA19 corresponds to the anode of the thyristor TH19, the emitter of the transistor QC19 corresponds to the cathode of the thyristor TH19, and the base of the transistor QC19 corresponds to the P-gate of the thyristor TH19.

The emitter and the base of the transistor QA19 are connected to one end (node N4) of the circuit block 19. Also, the collector of the transistor QC19 is connected to one end (node N4) of the circuit block 19, the emitter is connected to the other end (node N2) of the circuit block 19, and the base is connected to the collector of the transistor QA19.

The resistance element R19 is connected between the emitter and the base of the transistor QC19. The zener diode ZD19 is connected between the emitter of the transistor QA19 and the base of the transistor QC19, and has a cathode connected to the emitter of the transistor QA19 and an anode connected to the base of the transistor QC19.

The zener diode ZD19 allows current to flow to the resistance element R19 or to the base of the transistor QC19 when the potential of the node N1 becomes higher than the potential of the node N2 and the voltage between both ends of the circuit block 19 reaches the breakdown voltage. That is, current flows to the resistance element R19b, and current also flows to the base of the transistor QC19 when the base-emitter voltage of the transistor QC19 becomes greater than or equal to the threshold voltage. The transistor QC19 enters an ON state when current flows to the base of the transistor QC19, allowing current to flow from the node N4 to the node N2. Also, current flows from the emitter of the transistor QA19 to the collector, as a result of the voltage between both ends of the circuit block 19 rising. The voltage between the node N4 and the node N2 is clamped as a result of the above operations.

For example, the thyristor TH19 and the zener diode ZD19 of the circuit block 19 are formed in a P-well of a twin well structure. Also, the resistance element R19 is constituted by a resistance component of the P-well.

Figure 24:
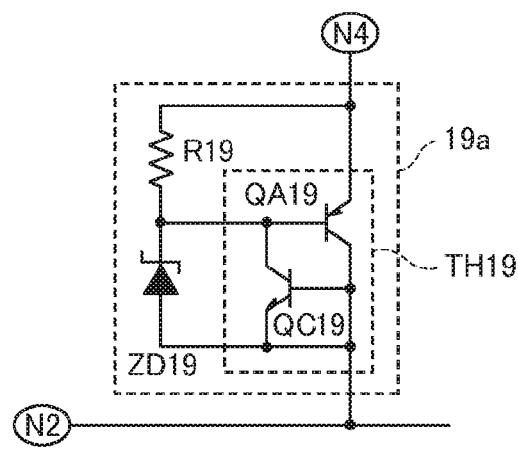
FIG. 24 is a circuit diagram showing a circuit block that is used in a modification of the sixth embodiment.

Alternatively, as a modification of the sixth embodiment, a circuit block 19a shown in FIG. 24 may be provided, instead of the circuit block 19, in the electrostatic protection circuit according to the sixth embodiment shown in FIG. 23.

FIG. 24 is a circuit diagram showing an exemplary configuration of a circuit block that is used in the modification of the sixth embodiment of the invention. As shown in FIG. 24, in the circuit block 19a, the connection relation between the elements in the circuit block 19 shown in FIG. 23 is changed. In the circuit block 19a, the emitter of the transistor QA19 corresponds to the anode of the thyristor TH19, the emitter of the transistor QC19 corresponds to the cathode of the thyristor TH19, and the base of the transistor QA19 corresponds to the N-gate of the thyristor TH19.

The emitter of the transistor QA19 is connected to one end (node N4) of the circuit block 19a and the collector is connected to the other end (node N2) of the circuit block 19a. Also, the collector of the transistor QC19 is connected to the base of the transistor QA19 and the emitter and the base are connected to the other end (node N2) of the circuit block 19a.

The resistance element R19 is connected between the emitter and the base of the transistor QA19. The zener diode ZD19 is connected between the emitter of the transistor QC19 and the base of the transistor QA19, and has an anode connected to the emitter of the transistor QC19 and a cathode connected to the base of the transistor QA19.

The zener diode ZD19 allows current to flow to the resistance element R19 or to the base of the transistor QA19 when the potential of the node N1 becomes higher than the potential of the node N2 and the voltage between both ends of the circuit block 19a reaches the breakdown voltage. That is, current flows to the resistance element R19, and current also flows to the base of the transistor QA19 when the emitter-base voltage of the transistor QA19 becomes greater than or equal to the threshold voltage. When current flows to the base of the transistor QA19, the transistor QA19 enters an ON state, allowing current to flow from the node N4 to the node N2. Also, current flows to the emitter from the collector of the transistor QC19, as a result of the voltage between both ends of the circuit block 19a rising. The voltage between the node N4 and the node N2 is clamped as a result of the above operations.

For example, the thyristor TH19 and the zener diode ZD19 of the circuit block 19a are formed in an N-well of a twin well structure. Also, the resistance element R19 is constituted by a resistance component of the N-well.

In the circuit block 19 shown in FIG. 23 or the circuit block 19a shown FIG. 24, the hold voltage of the thyristor TH19 is not very large, and thus it is also possible to form a circuit block in which the trigger voltage is set to a voltage approximating the hold voltage, by adjusting the breakdown voltage of the zener diode ZD19 through ion doping. In this application, the configuration of the circuit block 19 or 19a is called a zener trigger thyristor.

Figure 25:
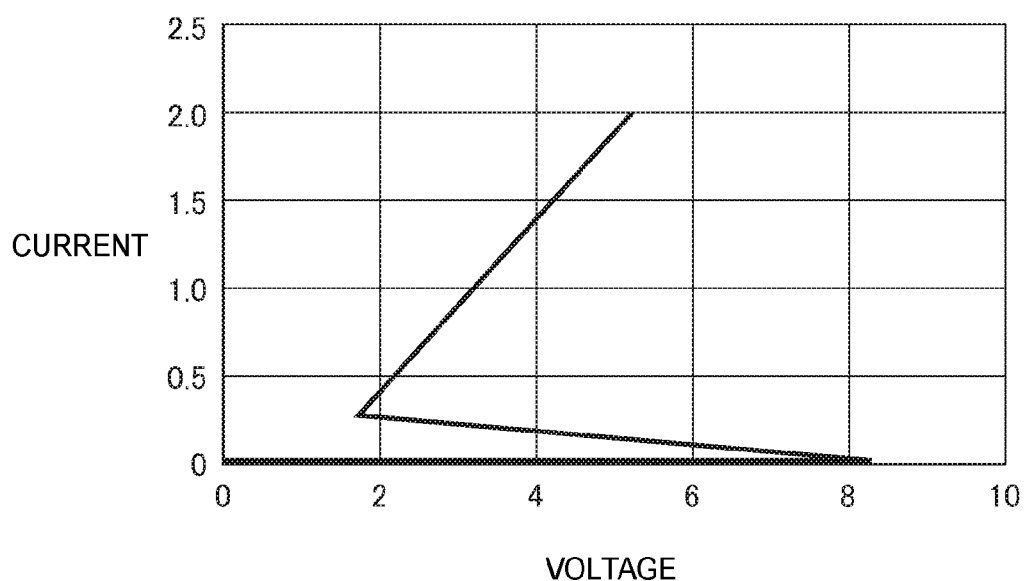
FIG. 25 is a diagram showing exemplary I-V characteristics of a zener trigger thyristor shown in FIG. 23.

FIG. 25 is a diagram showing exemplary I-V characteristics of the zener trigger thyristor shown in FIG. 23. In FIG. 25, the horizontal axis represents voltage (V) and the vertical axis represents current (A). The zener diode ZD19 allows current to flow to the P-gate of the thyristor TH19 when the potential of the node N1 becomes higher than the potential of the node N2 and the voltage between both ends of the circuit block 19 reaches the breakdown voltage (trigger voltage) of the zener diode ZD19, as shown in FIG. 25. Because the thyristor TH19 thereby enters an ON state, allowing current to flow from the node N4 to the node N2, the voltage between the node N4 and the node N2 is clamped at the hold voltage.

Figure 26:
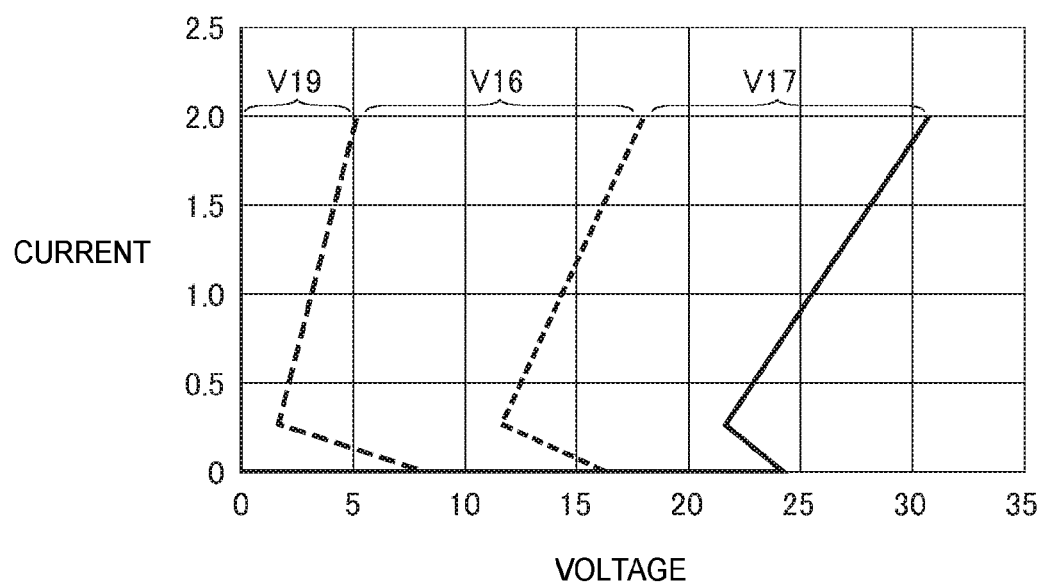
FIG. 26 is a diagram showing exemplary I-V characteristics of the electrostatic protection circuit shown in FIG. 23.

FIG. 26 is a diagram showing exemplary I-V characteristics of the electrostatic protection circuit shown in FIG. 23. In FIG. 26, the horizontal axis represents voltage (V) and the vertical axis represents current (A). As shown in FIG. 26, the voltage between both ends of the electrostatic protection circuit shown in FIG. 23 will be a voltage obtained by adding a voltage V16 between both ends of the circuit block 17 and a voltage V16 between both ends of the circuit block 17 to a voltage V19 between both ends of the circuit block 19.

Here, the trigger voltage of the overall electrostatic protection circuit can be set to a voltage approximating the hold voltage, by adjusting the breakdown voltage of the zener diode ZD19 of the circuit block 19 through ion doping. In the case of the I-V characteristic shown in FIG. 26, the electrostatic protection circuit can be used such that the hold voltage is higher than the power supply voltage.

Seventh Embodiment

Figure 27:
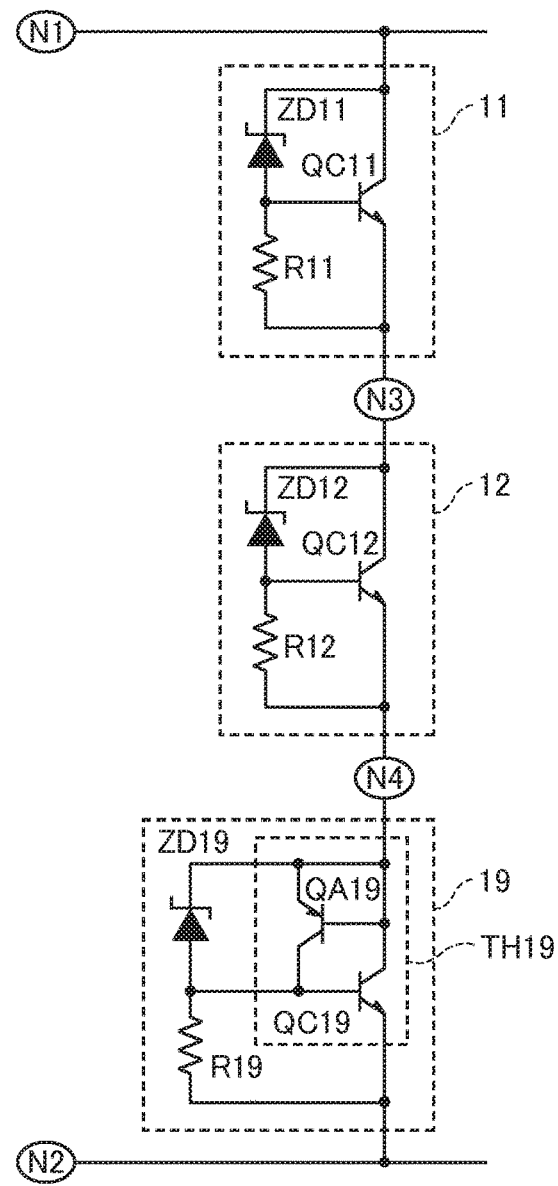
FIG. 27 is a circuit diagram showing an exemplary configuration of an electrostatic protection circuit according to a seventh embodiment of the invention.

FIG. 27 is a circuit diagram showing an exemplary configuration of an electrostatic protection circuit according to a seventh embodiment of the invention. In the seventh embodiment, circuit blocks 11 and 12 are provided, instead of the circuit blocks 16 and 17, in the electrostatic protection circuit according to the sixth embodiment shown in FIG. 23. In other respects, the seventh embodiment may be configured similarly to the sixth embodiment.

As shown in FIG. 27, an electrostatic protection circuit according to the seventh embodiment includes the circuit blocks 11, 12 and 19 connected in series between a node N1 and a node N2. The configuration shown in FIG. 27 is one example, and the number and connection order of the circuit blocks are arbitrary. For example, these circuit blocks may be connected in order of the circuit block 11, the circuit block 19 and the circuit block 12 from the node N1 side.

The circuit blocks 11 and 12 are similar to those shown in FIG. 3, and the circuit block 19 is similar to that shown in FIG. 23. Also, the zener diode ZD11, ZD12 and ZD19 have the same structure, and breakdown voltages thereof are equal to each other. The trigger voltage of the overall electrostatic protection circuit can be set to a voltage approximating the hold voltage, by adjusting the breakdown voltages of the zener diode ZD11, ZD12 and ZD19 through ion doping.

Also, the ratio of the voltages that are applied to the circuit blocks 11, 12 and 19 during normal operation can be set utilizing the leakage currents that flow through the zener diode ZD11, ZD12 and ZD19. In the electrostatic protection circuit shown in FIG. 27, the characteristics of the zener diode ZD11, ZD12, and ZD19 are the same, and thus the leakage currents thereof are equal to each other. Accordingly, during normal operation, the power supply voltage is equally divided and applied to the circuit blocks 11, 12 and 19.

Eighth Embodiment

Figure 28:
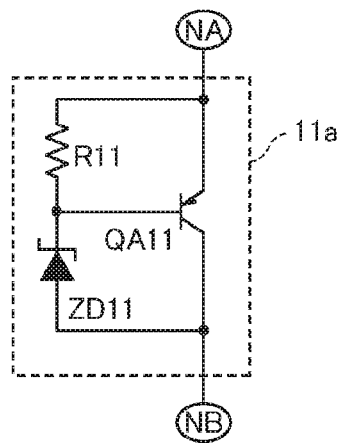
FIG. 28 is a circuit diagram showing a circuit block that is used in an eighth embodiment of the invention.

FIG. 28 is a circuit diagram showing an exemplary configuration of a circuit block that is used in the eighth embodiment of the invention. A circuit block 11a is used, instead of the circuit block 11 or 12, in the electrostatic protection circuit according to the embodiments described above.

As shown in FIG. 28, the circuit block 11a includes a PNP bipolar the transistor QA11, a resistance element R11, and a zener diode ZD11. The transistor QA11 has an emitter connected to one end (node NA) of the circuit block 11a and a collector connected to the other end (node NB) of the circuit block 11a.

The resistance element R11 is connected between the base and the emitter of the transistor QA11. The zener diode ZD11 is connected between the collector and the base of the transistor QA11, and has an anode connected to the collector of the transistor QA11 and a cathode connected to the base of the transistor QA11.

The zener diode ZD11 allows current to flow to the resistance element R11 or to the base of the transistor QA11 when the potential of the node N1 becomes higher than the potential of the node N2 and the voltage between both ends of the circuit block 11a reaches the breakdown voltage (trigger voltage of the circuit block 11a). That is, current flows to the resistance element R11, and current also flows to the base of the transistor QA11 when the emitter-base voltage of the transistor QA11 becomes greater than or equal to the threshold voltage. Because the transistor QA11 enters an ON state when current flows to the base of the transistor QA11, allowing current to flow from the node NA to the node NB, the voltage between the node NA and the node NB is clamped.

According to the above embodiment, a plurality of circuit blocks are connected in series, thus enabling a high hold voltage to be set. Also, because at least one circuit block includes a zener diode for setting the trigger voltage, the trigger voltage of the electrostatic protection circuit can be arbitrarily set, by adjusting the breakdown voltage of the zener diode through ion doping. Accordingly, an electrostatic protection circuit can be provided that enables a high hold voltage to be set and enables the trigger voltage to be set arbitrarily, without providing an RC timer having a large circuit area. Furthermore, a semiconductor integrated circuit device that has a high breakdown voltage and does not readily malfunction and with which an increase in chip size is suppressed can be provided by incorporating such an electrostatic protection circuit.

Electronic Device

Next, an electronic device according to one embodiment of the invention will be described.

Figure 29:
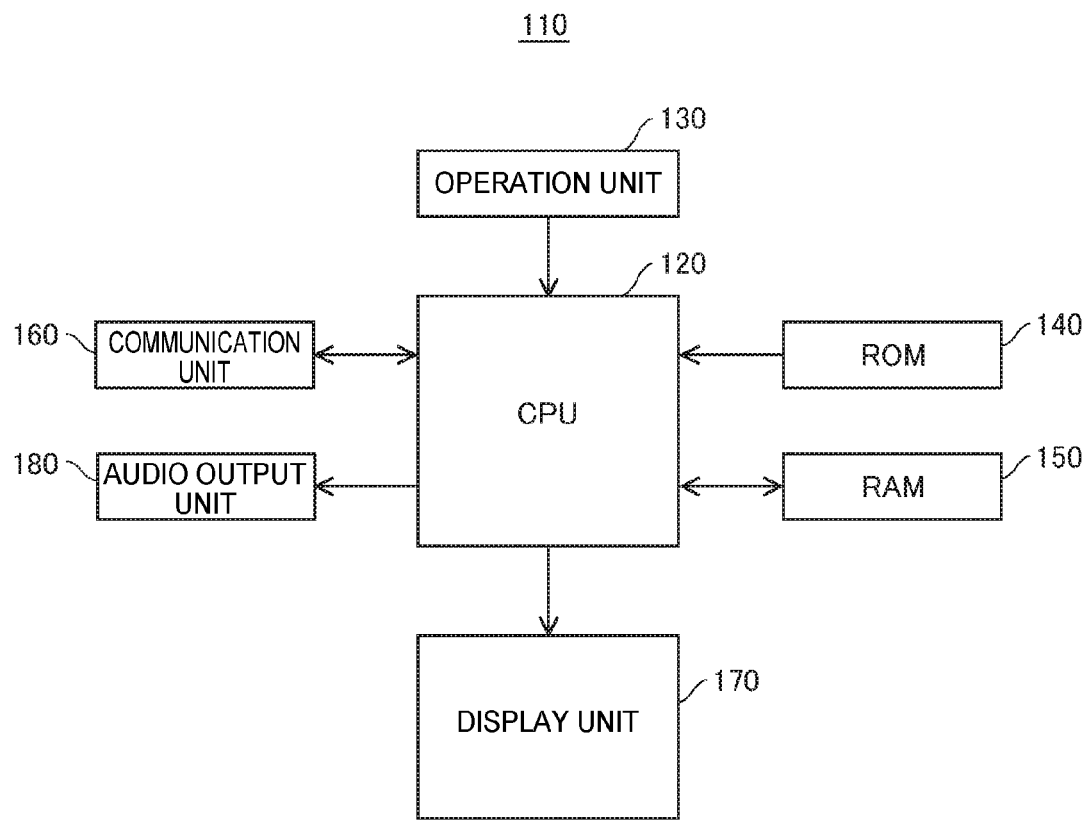
FIG. 29 is a block diagram showing an exemplary configuration of an electronic device according to one embodiment of the invention.

FIG. 29 is a block diagram showing an exemplary configuration of an electronic device according to one embodiment of the invention. As shown in FIG. 29, an electronic device 110 may include a CPU 120, an operation unit 130, a ROM (read-only memory) 140, a RAM (random access memory) 150, a communication unit 160, a display unit 170, and an audio output unit 180.

Here, the CPU 120 and at least some of constituent elements from the ROM 140 to the audio output unit 180 are incorporated in the semiconductor integrated circuit device according to one embodiment of the invention. Note that some of the constituent elements shown in FIG. 29 may be omitted or changed, or other constituent elements may be added to the constituent elements shown in FIG. 29.

The CPU 120 performs various types of signal processing and control processing using data that is supplied from outside and the like, in accordance with programs that are stored in the ROM 140 and the like. For example, the CPU 120 performs various types of signal processing according to operation signals that are supplied from the operation unit 130, controls the communication unit 160 in order to perform data communication with the outside, generates image signals for displaying various types of images on the display unit 170, and generates audio signals for outputting various types of audio from the audio output unit 180.

The operation unit 130, for example, is an input device including operation keys, button switches or the like, and outputs operation signals that depend on operations performed by a user to the CPU 120. The ROM 140 stores programs, data and the like for the CPU 120 to perform various types of signal processing and control processing. Also, the RAM 150 is used as a work area of the CPU 120, and temporarily stores programs and data read out from the ROM 140, data input using the operation unit 130, or the results of operations that the CPU 120 has executed in accordance with the programs.

The communication unit 160, for example, is constituted by analog circuitry and digital circuitry, and performs data communication between the CPU 120 and an external device. The display unit 170, for example, includes an LCD (liquid crystal display) or the like, and displays various types of images based on image signals that are supplied from the CPU 120. Also, the audio output unit 180, for example, includes a speaker or the like, and outputs audio based on audio signals that are supplied from the CPU 120.

The electronic device 110 corresponds, for example, to a clock such as a wrist watch or a table clock, a timer, a mobile phone or similar mobile terminal, a digital still camera, a digital video camera, a television, a TV phone, a security television monitor, a head-mounted display, a personal computer, a printer, a network device, a multifunction peripheral, an on-board device (navigation device, etc.), a calculator, an electronic dictionary, an electronic game machine, a robot, a measurement device, or a medical device (e.g., electronic thermometer, sphygmomanometer, blood glucose meter, electrocardiograph device, ultrasonic diagnostic apparatus, and electronic endoscope). According to this embodiment, a highly reliable electronic device can be provided at low cost, using a semiconductor integrated circuit device that has a high breakdown voltage and does not readily malfunction and with which an increase in chip size is suppressed.

In the invention, any of the above embodiments can also be used in combination. The invention is thus not limited to the embodiments described above, and many modifications can be made within the technical idea of the invention by a person having ordinary skill in the art.

The entire disclosure of Japanese Patent Application No. 2016-031696, filed Feb. 23, 2016 is expressly incorporated by reference herein.

What is claimed is:

1. An electrostatic protection circuit connected to a first terminal via a first node and connected to a second terminal via a second node, comprising:
   a plurality of circuit blocks that are connected in series between the first node and the second node,
   wherein at least one circuit block out of the plurality of circuit blocks includes:
      a zener diode for setting a trigger voltage, and enters a conduction state when a potential of the first node becomes higher than a potential of the second node and a voltage between both ends of the circuit block including the zener diode reaches a breakdown voltage of the zener diode;
      a thyristor that has an anode connected to one end of the circuit block including the zener diode and a cathode connected to another end of the circuit block including the zener diode; and
      a resistance element that is connected between a gate of the thyristor and one of the cathode and the anode of the thyristor, the resistance element being directly connected to the gate of the thyristor and directly connected to the one of the cathode and the anode of the thyristor,
   wherein the zener diode is connected between the gate of the thyristor and the other of the cathode and the anode of the thyristor, the zener diode being directly connected to the gate of the thyristor and the other of the cathode and the anode of the thyristor, and
   wherein the zener diode allows current to flow to the resistance element or to the gate of the thyristor when the potential of the first node becomes higher than the potential of the second node and the voltage between both ends of the circuit block including the zener diode reaches the breakdown voltage.

2. The electrostatic protection circuit according to claim 1,
   wherein the circuit block including the zener diode further includes:
      a bipolar transistor that has a collector connected to one end of the circuit block including the zener diode and an emitter connected to another end of the circuit block including the zener diode; and
      a resistance element that is connected between the emitter and a base of the bipolar transistor, and
      the zener diode is connected between the collector and the base of the bipolar transistor, and allows current to flow to the resistance element or to the base of the bipolar transistor when the potential of the first node becomes higher than the potential of the second node and the voltage between both ends of the circuit block including the zener diode reaches the breakdown voltage.

3. The electrostatic protection circuit according to claim 1,
   wherein another at least one circuit block out of the plurality of circuit blocks includes a MOS transistor that has a drain connected to one end of the other at least one circuit block and a source and a gate connected to another end of the other at least one circuit block, and that allows discharge current to flow when the potential of the first node becomes higher than the potential of the second node and the voltage between both ends of the other at least one circuit block reaches a breakdown voltage.

4. The electrostatic protection circuit according to claim 1,
wherein another at least one circuit block out of the plurality of circuit blocks includes a bipolar transistor that has a collector connected to one end of the other at least one circuit block and an emitter connected to another end of the other at least one circuit block, and that allows discharge current to flow when the potential of the first node becomes higher than the potential of the second node and the voltage between both ends of the other at least one circuit block reaches a breakdown voltage.

5. The electrostatic protection circuit according to claim 3,
wherein a predetermined region, of the drain or the source of the MOS transistor, including a portion that a contact contacts is silicided, and a remaining region of the drain or the source is not silicided.

6. The electrostatic protection circuit according to claim 4,
wherein a predetermined region, of the collector of the bipolar transistor, including a portion that a contact contacts is silicided, and a remaining region of the collector is not silicided.

7. The electrostatic protection circuit according to claim 1,
wherein another at least one circuit block out of the plurality of circuit blocks includes:
a thyristor that has an anode connected to one end of the other at least one circuit block and a cathode connected to another end of the other at least one circuit block;
a resistance element that is connected between a gate of the thyristor and one of the cathode and the anode of the thyristor; and
a zener diode that is connected between the gate of the thyristor and the other of the cathode and the anode of the thyristor, and that allows current to flow to the resistance element or to the gate of the thyristor when the potential of the first node becomes higher than the potential of the second node and the voltage between both ends of the circuit block reaches a second breakdown voltage.

8. A semiconductor integrated circuit device comprising the electrostatic protection circuit according to claim 1.

9. An electronic device comprising the semiconductor integrated circuit device according to claim 8.

* * * * *